United States Patent
Hasegawa et al.

(10) Patent No.: US 6,784,240 B2
(45) Date of Patent: Aug. 31, 2004

(54) CURABLE COMPOSITION

(75) Inventors: Nobuhiro Hasegawa, Settsu (JP); Yasuo Shimizu, Settsu (JP); Yoshiki Nakagawa, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/181,926

(22) PCT Filed: Dec. 22, 2000

(86) PCT No.: PCT/JP00/09162

§ 371 (c)(1),
(2), (4) Date: Nov. 12, 2002

(87) PCT Pub. No.: WO01/55259

PCT Pub. Date: Aug. 2, 2001

(65) Prior Publication Data

US 2003/0166756 A1 Sep. 4, 2003

(30) Foreign Application Priority Data

Jan. 28, 2000 (JP) ........................ 2000-019789

(51) Int. Cl.[7] .................................. C08J 3/20
(52) U.S. Cl. ..................... 524/560; 524/588; 524/612; 524/425; 525/326.1; 526/89; 526/194
(58) Field of Search ................. 524/560, 588, 524/612, 425; 525/326.1; 526/89, 194

(56) References Cited

U.S. PATENT DOCUMENTS

| | | | | |
|---|---|---|---|---|
| 5,880,195 A | * | 3/1999 | Kalinowski et al. | ........ 524/426 |
| 5,900,458 A | * | 5/1999 | Fujita et al. | ................ 524/788 |
| 2002/0086942 A1 | * | 7/2002 | Fujita et al. | ................ 525/100 |

FOREIGN PATENT DOCUMENTS

| | | |
|---|---|---|
| JP | 1247403 | 10/1989 |
| JP | 5255415 | 10/1993 |
| JP | 5262808 | 10/1993 |
| JP | 6211922 | 8/1994 |
| JP | 9272714 | 10/1997 |
| JP | 9272715 | 10/1997 |
| JP | 10316804 | 12/1998 |
| JP | 10316811 | 12/1998 |
| JP | 11005815 | 1/1999 |
| JP | 11080249 | 3/1999 |
| JP | 11080250 | 3/1999 |
| JP | 11080570 | 3/1999 |
| JP | 11080571 | 3/1999 |
| JP | 2918418 | 4/1999 |
| JP | 11100433 | 4/1999 |
| JP | 11116606 | 4/1999 |
| JP | 11116617 | 4/1999 |
| JP | 11116763 | 4/1999 |
| JP | 11130931 | 5/1999 |
| JP | 11246762 | 9/1999 |
| JP | 11293130 | 10/1999 |
| JP | 3078065 | 6/2000 |
| WO | WO 9905215 A1 * | 2/1999 ........... C08L/57/06 |

* cited by examiner

Primary Examiner—David W. Wu
Assistant Examiner—Satya Sastri
(74) Attorney, Agent, or Firm—Westerman, Hattori, Daniels & Adrian, LLP

(57) ABSTRACT

The invention relates to a curable composition comprising a crosslinking silyl-containing vinyl polymer. The curable composition of the invention can be utilized, for example, as sealants such as elastic sealants for building and construction, electric or electronic part materials such as solar battery backside sealants, electric insulating materials such as insulating sheath of wire or cable, pressure sensitive adhesives, adhesives, and paints.

A curable composition
which comprises the following two components:
(A) a vinyl polymer (I) having at least one crosslinking functional group and
(B) heavy or ground calcium carbonate (II) having a specific surface area of not smaller than 1.5 $m^2/g$ but not larger than 50 $m^2/g$.

21 Claims, No Drawings

US 6,784,240 B2

CURABLE COMPOSITION

TECHNICAL FIELD OF THE INVENTION

The present invention relates to a curable composition. More particularly, it relates to a curable composition which comprises a vinyl polymer having at least one crosslinking silyl group, together with heavy or ground calcium carbonate having a specific surface area of not smaller than 1.5 $m^2/g$ but not larger than 50 $m^2/g$.

BACKGROUND ART

Unlike polymers obtained by ionic polymerization or polycondensation, few vinyl polymers obtainable by radical polymerization and having a functional group, in particular a terminal functional group, have been put to practical use. Among vinyl polymers, (meth)acrylic polymers have high weatherability, transparency and other characteristics that cannot be possessed by the polyether polymers, hydrocarbon polymers or polyester polymers. (Meth) acrylic polymers having an alkenyl group or crosslinking silyl group on their side chains are being utilized in high-weatherability coating compositions and the like. On the other hand, the polymerization of acrylic polymers is not easy to control because of side reactions. Moreover, introduction of functional group into terminus is very difficult.

Vinyl polymers having an alkenyl group at a molecular chain terminus, if obtained by a simple and easy method, cured products excellent in cured product physical properties will possibly be obtained as compared with vinyl polymers having crosslinking groups on their side chains. Therefore, investigations concerning the methods of production thereof have been made by a number of researchers. However, it is not easy as yet to produce them on an industrial scale. In Japanese Kokai Publication Hei-01-247403 and Japanese Kokai Publication Hei-05-255415, for instance, there is disclosed a method of synthesizing alkenyl group-terminated (meth) acrylic polymers which uses an alkenyl group-containing disulfide as a chain transfer agent.

In Japanese Kokai Publication Hei-05-262808, there is disclosed a method of synthesizing alkenyl group-terminated (meth)acrylic polymers which comprises synthesizing a vinyl polymer having a hydroxyl group at both termini using a hydroxyl group-containing disulfide and further utilizing the reactivity of the hydroxyl group.

In Japanese Kokai Publication Hei-05-211922, there is disclosed a method of synthesizing silyl group-terminated (meth)acrylic polymers which comprises synthesizing a vinyl polymer having a hydroxyl group at both termini using a hydroxyl group-containing polysulfide and further utilizing the reactivity of the hydroxyl group.

By any of these methods, however, it is difficult to introduce functional groups into both termini of the molecule with certainty so that a cured product having satisfactory characteristics may hardly be obtained. For introducing functional groups into both termini of the molecule with certainty, it is essential to use a large amount of the chain transfer agent, and this is a problem from the production process viewpoint. In carrying out these methods, ordinary radical polymerization is used, so that it is difficult to control the molecular weight and molecular weight distribution (ratio between weight average molecular weight and number average molecular weight) of the polymer to be obtained.

In view of such state of the art, the present inventors have so far made a large number of inventions relating to various crosslinking functional group-terminated vinyl polymers, methods of producing the same, curable compositions comprising the same and uses thereof (see, for example, Japanese Kokai Publication Hei-11-080249, Japanese Kokai Publication Hei-11-080250, Japanese Kokai Publication Hei-11-005815, Japanese Kokai Publication Hei-11-116617, Japanese Kokai Publication Hei-11-116606, Japanese Kokai Publication Hei-11-080571, Japanese Kokai Publication Hei-11-080570, Japanese Kokai Publication Hei-11-130931, Japanese Kokai Publication Hei-11-100433, Japanese Kokai Publication Hei-11-116763, Japanese Kokai Publication Hei-09-272714 and Japanese Kokai Publication Hei-09-272715).

For example, a vinyl polymer having a silicon-containing group (hereinafter also referred to as "crosslinking silyl group"), which has a silicon atom-bound hydroxyl group or a hydrolyzable group and is capable of being crosslinked under formation of a siloxane bond, or cured products derived from a composition comprising such vinyl polymer are excellent in heat resistance and weatherability and are applicable in various uses, including, but being not limited to, sealants such as elastic sealants for building and construction and sealants for multilayer glass, materials for electric and electronic parts, such as solar battery backside sealants, electric insulating materials such as insulating sheath for electric wires and cables, pressure sensitive adhesives, adhesives, elastic adhesives, paints, powder coatings, coating materials, foamed articles, potting agents for electric and electronic use, films, gaskets, casting materials, various molding materials, and rustproof and waterproof sealants for end faces (cut edges)of net glass or laminated glass.

Among them, elastic sealants for building and construction contain in many cases general-purpose heavy or ground calcium carbonate having a specific surface area of about 1 $m^2/g$ as incorporated therein. This is for the purpose of reducing the cost of compositions and improving the restorability of cured products, among others. However, when such general-purpose heavy or ground calcium carbonate is used in the above-mentioned vinyl polymers having a crosslinking functional group, there arises a problem in that cured products showing a high level of elongation as required of elastic sealants for building and construction can hardly be obtained. Furthermore, the curable composition tends to readily string, hence improvements in viscosity ratio and knife releasability are required in certain instances.

On the other hand, as a demand from the relevant market, not only sealants for multilayer glass but also elastic sealants for building and construction (in particular single-component elastic sealants) are required to be capable of firmly bonding to various adherends without applying any primer, namely to be excellent in non-primer adhesiveness. Furthermore, sealing compositions for use in contact with glass, for example sealants for multilayer glass, are required to be excellent in weather-resistant adhesiveness, in particular. However, when the above-mentioned general-purpose heavy or ground calcium carbonate is used in combination with the above-mentioned crosslinking functional group-containing vinyl polymers, the non-primer adhesiveness and weather-resistant adhesiveness are unsatisfactory. A particular problem is that the weather-resistant adhesiveness to highly insulating, heat ray-reflecting glass whose surface is coated with a metal oxide or the like is insufficient.

DISCLOSURE OF THE INVENTION

It is an object of the present invention to improve the viscosity ratio and knife releasability of a curable composition whose main component is a vinyl polymer having at least one crosslinking functional group and improve the cured products obtained therefrom with respect to their breaking strength, breaking elongation, adhesiveness to various adherends, and weather-resistant adhesiveness to various kinds of glass, in particular heat ray-reflecting glass.

In view of the state of the art as explained above, the present inventors made intensive investigations and, as a result, found that when a specific filler is added to the above polymer, the viscosity ratio and knife releasability of the resulting composition can be improved without lowering the rate of curing of the composition or without otherwise adversely affecting the same and, at the same time, the breaking strength, breaking elongation, adhesiveness and weather-resistant adhesiveness of the cured products to various adherends derived therefrom can be improved. The inventors have thus solved the above-discussed problems and have been led to completion of the present invention.

The invention thus provides a curable composition which comprises the following two components: a vinyl polymer (I) having at least one crosslinking functional group, and heavy or ground calcium carbonate (II) having a specific surface area of not smaller than 1.5 m$^2$/g but not larger than 50 m$^2$/g.

The main chain of the vinyl polymer (I) is not particularly restricted but preferably is one produced by polymerizing a monomer selected from the group consisting of (meth) acrylic monomers, acrylonitrile monomers, aromatic vinyl monomers, fluorine-containing vinyl monomers and silicon-containing vinyl monomers as a main monomer, more preferably one produced by polymerizing a (meth) acrylic monomer, still more preferably an acrylic monomer, much more preferably an acrylic ester monomer, most preferably a butyl acrylate monomer.

The ratio of the weight average molecular weight (Mw) and number average molecular weight (Mn), namely the ratio Mw/Mn, of the vinyl polymer (I) as determined by gel permeation chromatography is not particularly restricted but preferably is less than 1.8.

The main chain of the vinyl polymer (I) is not particularly restricted but preferably is one produced by living radical polymerization, more preferably by atom transfer radical polymerization. The catalyst to be used in the atom transfer radical polymerization is not particularly restricted but preferably is a complex of a metal selected from the group consisting of copper, nickel, ruthenium and iron, more preferably a copper complex.

The crosslinking functional group of the vinyl polymer (I) is not particularly restricted but preferably is a crosslinking silyl group, alkenyl group, hydroxyl group, amino group, polymerizable carbon-carbon double bond, or epoxy group, or the like.

The position of the crosslinking functional group within the vinyl polymer (I) is not restricted but preferably is a terminal site. Although the polymer may additionally have a similar functional group within the main chain, it is desirable, when the crosslinked cured product is required to have rubber elasticity, for instance, that the polymer have a functional group only at a terminus.

The number of crosslinking functional groups in the vinyl polymer (I) is not particularly restricted but, for obtaining cured products higher in crosslinking efficiency, it is, on the average, not less than 1, preferably not less than 1.2, more preferably not less than 1.5.

The vinyl polymer (I) is not restricted but preferably is one produced by living radical polymerization, more preferably by atom transfer radical polymerization. Further, the atom transfer radical polymerization is not restricted but preferably is carried out using, as the catalyst, a complex elected from among transition metal complexes in which the main atom is an element of the group 7, 8, 9, 10 or 11 of the periodic table of the elements, more preferably a complex selected from the group consisting of complexes of copper, nickel, ruthenium, and iron, most preferably a copper complex.

The heavy or ground calcium carbonate (II) having a specific surface area of not smaller than 1.5 m$^2$/g but not larger than 50 m$^2$/g is not particularly restricted but preferably is surface-treated heavy or ground calcium carbonate. The mixing proportion thereof is not particularly restricted, either. It is preferred, however, that the composition contain 5 to 500 parts by weight of the heavy or ground calcium carbonate (II) per 100 parts by weight of the vinyl polymer (I). For improving the adhesiveness, and the weather-resistant adhesiveness to glass, 0.1 to 20 parts by weight of a silane coupling agent is preferably used in combination as component (C), without any particular limitation.

When the curable composition according to the invention, which comprises a vinyl polymer having a crosslinking functional group, is used, the viscosity ratio of the curable composition increases and the knife releasability is improved, and the mechanical properties and adhesiveness of the cured products obtained therefrom are improved. By using the curable composition of the invention, it becomes possible to obtain cured products high in elongation (e.g. EB) without causing decreases in strength (e.g. M50, Tmax).

BEST MODES FOR CARRYING OUT THE INVENTION

The present invention thus relates to a curable composition improved in the viscosity ratio and knife releasability thereof and in the breaking strength, breaking elongation, adhesiveness and weather-resistant adhesiveness to various adherends, of the cured products, which comprises a vinyl polymer (I) having at least one crosslinking functional group, and heavy or ground calcium carbonate (II) having a specific surface area of not smaller than 1.5 m$^2$/g but not larger than 50 m$^2$/g. In the following, the curable composition of the invention is described in detail.

Re: Vinyl Polymer (I)

Main Chain

The vinyl monomer constituting the main chain of the vinyl polymer (I) according to the invention is not particularly restricted but includes various species. As examples, there may be mentioned (meth) acrylic monomers such as (meth) acrylic acid, methyl (meth)acrylate, ethyl (meth) acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth) acrylate, cyclohexyl (meth)acrylate, n-heptyl (meth) acrylate, n-octyl (meth)acrylate, 2-ethylhexyl (meth) acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth) acrylate, stearyl (meth)acrylate, glycidyl (meth)acrylate, 2-aminoethyl (meth)acrylate, γ-(methacryloyloxypropyl) trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth) acrylate, 2-perfluoromethyl-2-perfluoroethylmethyl (meth) acrylate, 2-perfluorohexylethyl (meth)acrylate, 2-perfluorodecylethyl (meth)acrylate, and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and maleic acid monoalkyl esters and dialkyl esters; fumaric acid, and fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; vinyl chloride, vinylidene chloride, allyl chloride, allyl alcohol, and the like. These may be used singly or a plurality of them may be subjected to copolymerization. Among them, styrenic monomers and (meth) acrylic monomers are preferred from the viewpoint of physical properties of products. Acrylic ester monomers and methacrylic ester monomers are more preferred, acrylic ester monomers are particularly preferred, and butyl acrylate is most preferred. In the practice of the invention, these preferred monomers maybe copolymerized or block copolymerized with other monomers. On such occasion, these preferred monomers preferably account for at least 40% by weight of the monomer composition. In the above form of expression, "(meth) acrylic acid", for instance, means acrylic acid and/or methacrylic acid.

The molecular weight distribution, namely the ratio between the weight average molecular weight and number average molecular weight as determined by gel permeation chromatography, of the polymer (I) according to the invention is not particularly restricted but preferably is less than 1.8 but not less than 1.01, preferably not more than 1.7 but not less than 1.01, more preferably not more than 1.6 but not less than 1.01, still more preferably not more than 1.5 but not less than 1.01, particularly preferably not more than 1.4 but not less than 1.01, most preferably not more than 1.3 but not less than 1.01. In the practice of the invention, the GPC measurement is generally carried out on a polystyrene gel column using chloroform as a mobile phase, and the number average molecular weight can be determined on the polystyrene equivalent basis.

The number average molecular weight of the vinyl polymer according to the invention is not particularly restricted but preferably within the range of 500 to 1,000,000, more preferably 1,000 to 100,000.

Method of Main Chain Synthesis

Although the method of synthesizing the vinyl polymer (I) according to the invention is not restricted, controlled radical polymerization is preferred, living radical polymerization is more preferred, and atom transfer radical polymerization is particularly preferred. These are explained in the following.

Controlled Radical Polymerization

Radical polymerization methods can be classified into "ordinary radical polymerization methods" which comprise merely copolymerizing a monomer having a specific functional group and a vinyl monomer using an azo compound, a peroxide or the like as a polymerization initiator, and "controlled radical polymerization methods" by which a specific functional group can be introduced into a controlled site, for example a terminus.

"Ordinary radical polymerization methods" are simple and easy to perform but allow the specific functional group-containing monomer to be introduced into the polymer only at random. For obtaining polymers with a high percentage of functionalization, it is necessary to use this monomer in fairly large amounts. When, conversely, only a small amount of the monomer is used, the problem arises that the proportion of polymer molecules formed without introduction of this specific functional group increases. Further, since they consist in free radical polymerization, there is another problem, namely only polymers with a wide molecular weight distribution and a high viscosity can be obtained.

"Controlled radical polymerization methods" can be further classified into "chain transfer agent methods" which comprise carrying out polymerization using a chain transfer agent having a specific functional group to give functional group-terminated vinyl polymers and "living radical polymerization methods" by which growing polymer termini can grow, without undergoing termination and like reactions, to give polymers with a molecular weight approximately as designed.

"Chain transfer agent methods" can give polymers with a high level of functionalization but require the use of a fairly large amount of a chain transfer agent having a specific functional group relative to the initiator, hence have economical problems, inclusive of treatment-related problems. Like the above-mentioned "ordinary radical polymerization methods", there is also the problem that only polymers having a wide molecular weight distribution and a high viscosity can be obtained because of their consisting in free radical polymerization.

Unlike these polymerization methods, "living radical polymerization methods" hardly undergo termination reactions and can give polymers with a narrow molecular weight distribution (Mw/Mn being about 1.1 to 1.5) and make it possible to arbitrarily control the molecular weight by changing the monomer-to-initiator formulating ratio, in spite of their belonging to the class of radical polymerization methods regarded as being difficult to control because of high rates of polymerization and a tendency toward ready occurrence of termination reactions, such as radical-to-radical coupling.

Therefore, such "living radical polymerization methods" are more preferred as the methods of producing the specific functional group-containing vinyl polymers mentioned above, since they can give polymers narrow in molecular weight distribution and low in viscosity and, in addition, make it possible to introduce specific functional group-containing monomers into the polymers at almost arbitrary positions.

The term "living polymerization", in its narrow sense, means a mode of polymerization in which molecular chains grow while their terminus always retain activity. In the ordinary sense, however, the term also includes the mode of pseudo-living polymerization in which molecular chains grow while terminally inactivated ones and terminally activated ones are in equilibrium. The latter definition applies also in the present invention.

In recent years, "living radical polymerization methods" have actively been studied by a large number of groups of researchers. For example, there may be mentioned the one using a cobalt porphyrin complex, as described in the Journal of the American Chemical Society (J. Am. Chem. Soc.), 1994, vol. 116, page 7943, the one using a radical capping agent, such as a nitroxide compound, as described in Macromolecules, 1994, vol. 27, page 7228, and "atom transfer radical polymerization" (ATRP) using an organic halide or the like as an initiator and a transition metal complex as a catalyst.

Among the "living radical polymerization methods", the "atom transfer radical polymerization", by which vinyl monomers are polymerized using an organic halide or halogenated sulfonyl compound, among others, as an initiator and a transition metal complex as a catalyst, are more preferred as the method of producing specific functional group-containing vinyl polymers, since it not only has the above characteristic features of "living radical polymerization" but also gives polymers having a terminal halogen atom relatively convenient for functional group conversion reactions and, further, the degree of freedom is large in initiator and catalyst designing. As examples of this atom transfer radical polymerization, there may be mentioned those described in Matyjaszewski et al.: J. Am. Chem. Soc., 1995, vol. 117, page 5614, Macromolecules, 1995, vol. 28, page 7901, Science, 1996, vol. 272, page 866, WO 96/30421, WO 97/18247, WO 98/01480, WO 98/40415 and Sawamoto et al.: Macromolecules, 1995, vol. 28, page 1721, Japanese Kokai Publication Hei-09-208616 and Japanese Kokai Publication Hei-08-41117, among others.

Which of such living radical polymerization methods is to be used is not critical in the practice of the present invention. Preferred, however, is the atom transfer radical polymerization.

In the following, this living radical polymerization is described in detail. Prior thereto, one mode of controlled radical polymerization, namely polymerization using a chain transfer agent, which can be used in producing the polymer (I) to be described later herein, is first described. The radical polymerization using a chain transfer agent (telomer) is not particularly restricted but includes, for example, the following two methods for producing vinyl polymers having a terminal structure suited for being utilized in the practice of the present invention.

One method produces halogen-terminated polymers by using a halogenated hydrocarbon as a chain transfer agent, as described in Japanese Kokai Publication Hei-04-132706, and the other produces hydroxyl-terminated polymers using a hydroxyl-containing mercaptan or a hydroxyl-containing polysulfide or the like as a chain transfer agent, as described in Japanese Kokai Publication Sho-61-271306, JP 2594402 or Japanese Kokai Publication Sho-54-47782.

The living radical polymerization is now described.

First, the method which uses a radical capping agent such as a nitroxide compound is described. In this polymerization, a nitroxy free radical (=N—O.), which is generally stable, is used as a radical capping agent. Such compound includes, as preferred species, but is not limited to, 2,2,6,6-tetrasubstituted-1-piperidinyloxy radicals, 2,2,5,5-tetrasubstituted-1-pyrrolidinyloxy radicals and like cyclic hydroxyamine-derived nitroxy free radicals. Suitable as the substituent are alkyl groups containing not more than 4 carbon atoms, such as methyl or ethyl. Specific nitroxy free radical compounds include, but are not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylamine-oxy radical. It is also possible to use other stable free radicals, such as galvinoxyl free radical, in lieu of nitroxy free radicals.

The above radical capping agent is used in combination with a radical generator. Presumably, a reaction product formed from the radical capping agent and radical generator serves as a polymerization initiator to allow the polymerization of addition-polymerizable monomers to proceed. Although the ratio between both is not particularly restricted, the radical initiator is used appropriately in an amount of 0.1 to 10 moles per mole of the radical capping agent.

While various compounds can be used as the radical generator, a peroxide capable of generating a radical under polymerization temperature conditions is preferred. Such peroxide includes, but is not limited to, diacyl peroxides such as benzoyl peroxide and lauroyl peroxide, dialkyl peroxides such as dicumyl peroxide and di-t-butyl peroxide, peroxycarbonates such as diisopropyl peroxydicarbonate and bis(4-t-butylcyclohexyl) peroxydicarbonate, and alkyl peresters such as t-butyl peroxyoctoate and t-butyl peroxybenzoate. In particular, benzoyl peroxide is preferred. Further, other radical generators, for example radical-generating azo compounds such as azobisisobutyronitrile can be used in lieu of peroxides.

Alkoxyamine compounds such as those illustrated below may be used as initiators in lieu of the combined use of a radical capping agent and a radical generator, as reported in Macromolecules, 1995, vol. 28, page 2993.

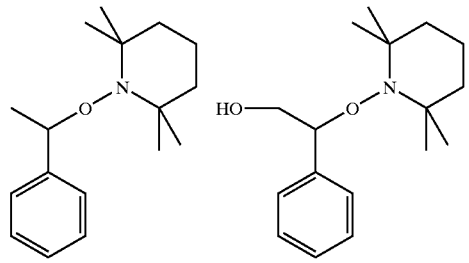

When an alkoxyamine compound is used as an initiator and that compound is one having a functional group, such as a hydroxyl group, such as the one illustrated above, functional group-terminated polymers are obtained. When this is utilized in the practice of the present invention, functional group-terminated polymers can be obtained.

The polymerization conditions, including monomers, solvent and polymerization temperature, to be used in the above-mentioned polymerization using a radical capping agent such as a nitroxide compound are not particularly restricted but may be the same as those used in the atom transfer radical polymerization mentioned below.

Atom Transfer Radical Polymerization

Now, the atom transfer radical polymerization method, which is more preferred as the living radical polymerization in carrying out the present invention is described.

In this atom transfer radical polymerization, an organic halide, in particular a highly reactive carbon-halogen bond-containing organic halide (e.g. a carbonyl compound having a halogen at an α-position or a compound having a halogen at a benzyl position), a halogenated sulfonyl compound or the like is used as an initiator.

Specific examples are as follows:

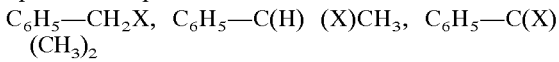

(in the above chemical formulas, $C_6H_5$ is a phenyl group and X is a chlorine, bromine or iodine atom);

$R^1$—C(H) (X)—CO$_2$R$^2$, $R^1$—C(CH$_3$) (X)—CO$_2$R$^2$,
$R^1$—C(H) (X)—C(O)R$^2$, $R^1$—C(CH$_3$) (X)—C(O)R$^2$ (in the above formulas, R$^1$ and R$^2$ each is a hydrogen atom or an alkyl, aryl or aralkyl group containing 1 to 20 carbon atoms and X is a chlorine, bromine or iodine atom);

$R^1$—C$_6$H$_4$—SO$_2$X (in the above formula, R$^1$ is a hydrogen atom or an alkyl, aryl or aralkyl group containing 1 to 20 carbon atoms and X is a chlorine, bromine or iodine atom); and the like.

An organic halide or a halogenated sulfonyl compound having a further functional group in addition to the functional group for initiating the polymerization may also be used as the initiator in atom transfer radical polymerization. In such case, vinyl polymers having the functional group at one main chain terminus and the structure of the growing terminus in atom transfer radical polymerization at the other main chain terminus are produced. As such functional group, there may be mentioned alkenyl, crosslinking silyl, hydroxyl, epoxy, amino and amide groups, among others.

The alkenyl group-containing organic halide is not particularly restricted but includes, among others, those having a structure represented by the general formula 1:

$$R^4R^5C(X)—R^6—R^7—C(R^3)=CH_2 \quad (1)$$

(wherein R$^3$ is a hydrogen atom or a methyl group, R$^4$ and R$^5$ each is a hydrogen atom or a univalent alkyl, aryl or aralkyl group containing 1 to 20 carbon atoms and such R$^4$ and R$^5$ groups may be bonded together at the respective other ends, R$^6$ is —C(O)O— (ester group), —C(O)— (keto group) or an o-, m- or p-phenylene group, R$^7$ is a direct bond or a divalent organic group containing 1 to 20 carbon atoms, which may contain one or more ether bonds, and X is a chlorine, bromine or iodine atom.)

As specific examples of the substituent R$^4$ and R$^5$, there may be mentioned a hydrogen atom, and methyl, ethyl, n-propyl, isopropyl, butyl, pentyl, hexyl and like groups. R$^4$ and R$^5$ may be bonded together at the respective other ends to form a cyclic skeleton.

As specific examples of the alkenyl-containing organic halide represented by the general formula 1, there may be mentioned the following:

XCH$_2$C(O)O(CH$_2$)$_n$CH=CH$_2$, H$_3$CC(H) (X)C(O)O (CH$_2$)$_n$CH=CH$_2$, (H$_3$C)$_2$C(X)C(O)O(CH$_2$)$_n$ CH=CH$_2$, CH$_3$CH$_2$C(H) (X)C(O)O(CH$_2$)$_n$CH=CH$_2$,

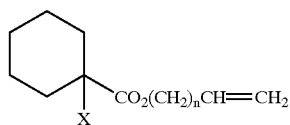

(in the above formulas, X is a chlorine, bromine or iodine atom and n is an integer of 0 to 20);
XCH$_2$C(O)O(CH$_2$)$_n$O(CH$_2$)$_m$CH=CH$_2$,
H$_3$CC(H) (X)C(O)O(CH$_2$)$_n$O(CH$_2$)$_m$CH=CH$_2$,
(H$_3$C)$_2$C(X)C(O)O(CH$_2$)$_n$O(CH$_2$)$_m$CH=CH$_2$, CH$_3$CH$_2$C(H) (X)C(O)O(CH$_2$)$_n$O(CH$_2$)$_m$CH=CH$_2$,

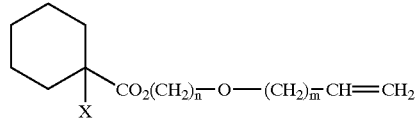

(in the above formulas, X is a chlorine, bromine or iodine atom, n is an integer of 1 to 20 and m is an integer of 0 to 20);
o-, m-, p-XCH$_2$—C$_6$H$_4$—(CH$_2$)$_n$—CH=CH$_2$, o-, m-, p-CH$_3$C(H) (X)—C$_6$H$_4$—(CH$_2$)$_n$—CH=CH$_2$, o-, m-, p-CH$_3$CH$_2$C(H) (X)—C$_6$H$_4$—(CH$_2$)$_n$—CH=CH$_2$
(in the above formulas, X is a chlorine, bromine or iodine atom and n is an integer of 0 to 20);
o-, m-, p-XCH$_2$—C$_6$H$_4$—(CH$_2$)$_n$—O—(CH$_2$)$_m$—CH=CH$_2$, o-, m-,
p-CH$_3$C(H) (X)—C$_6$H$_4$—(CH$_2$)$_n$—O—(CH$_2$)$_m$—CH=CH$_2$, o-, m-,
p-CH$_3$CH$_2$C(H) (X)—C$_6$H$_4$—(CH$_2$)$_n$—O—(CH$_2$)$_m$—CH=CH$_2$
(in the above formulas, X is a chlorine, bromine or iodine atom,
n is an integer of 1 to 20 and m is an integer of 0 to 20);
o-, m-, p-XCH$_2$—C$_6$H$_4$—O—(CH$_2$)$_n$—CH=CH$_2$, o-, m-,
p-CH$_3$C(H) (X)—C$_6$H$_4$—O—(CH$_2$)$_n$—CH=CH$_2$, o-, m-,
p-CH$_3$CH$_2$C(H) (X)—C$_6$H$_4$—O—(CH$_2$)$_n$—CH=CH$_2$
(in the above formulas, X is a chlorine, bromine or iodine atom and n is an integer of 0 to 20);
o-, m-, p-XCH$_2$—C$_6$H$_4$—O—(CH$_2$)$_n$—O—(CH$_2$)$_m$—CH=CH$_2$, o-, m-,
p-CH$_3$C(H) (X)—C$_6$H$_4$—O—(CH$_2$)$_n$—O—(CH$_2$)$_m$—CH=CH$_2$, o-, m-,
p-CH$_3$CH$_2$C(H) (X)—C$_6$H$_4$—O—(CH$_2$)$_n$—O—(CH$_2$)$_m$—CH=CH$_2$
(in the above formulas, X is a chlorine, bromine or iodine atom,
n is an integer of 1 to 20 and m is an integer of 0 to 20).

As the alkenyl-containing organic halide, there may further be mentioned compounds represented by the general formula 2:

$$H_2C=C(R^3)—R^7—C(R^4) (X)—R^8—R^5 \quad (2)$$

(wherein R$^3$, R$^4$, R$^5$, R$^7$ and X are as defined above and R$^8$ represents a direct bond, —C(O)O— (ester group), —C(O)— (keto group) or an o-, m- or p-phenylene group).

R$^6$ is a direct bond or a divalent organic group (which may contain one or more ether bonds) containing 1 to 20 carbon atoms. When it is a direct bond, a vinyl group is bound to the carbon atom to which a halogen is bound, whereby an allyl halide compound is formed. In this case, the carbon-halogen bond is activated by the neighboring vinyl group, so that R$^8$ is not always required to be a C(O)O or phenylene group, for instance, but may be a direct bond. When R$^7$ is other than a direct bond, R$^8$ should preferably be a C(O)O, C(O) or phenylene group so that the carbon-halogen bond may be activated.

Specific examples of the compound of general formula 2 are as follows:

CH$_2$=CHCH$_2$X, CH$_2$=C(CH$_3$)CH$_2$X, CH$_2$=CHC(H) (X)CH$_3$,

CH$_2$=C(CH$_3$)C(H) (X)CH$_3$, CH$_2$=CHC(X) (CH$_3$)$_2$,
CH$_2$=CHC(H) (X)C$_2$H$_5$,

CH$_2$=CHC(H) (X)CH(CH$_3$)$_2$, CH$_2$=CHC(H) (X)C$_6$H$_5$,
CH$_2$=CHC(H) (X)CH$_2$C$_6$H$_5$,

CH$_2$=CHCH$_2$C(H) (X)—CO$_2$R, CH$_2$=CH(CH$_2$)$_2$C(H) (X)—CO$_2$R,

CH$_2$=CH(CH$_2$)$_3$C(H) (X)—CO$_2$R, CH$_2$=CH(CH$_2$)$_8$C(H) (X)—CO$_2$R,

CH$_2$=CHCH$_2$C(H) (X)—C$_6$H$_5$, CH$_2$=CH(CH$_2$)$_2$C(H) (X)—C$_6$H$_5$,

CH$_2$=CH(CH$_2$)$_3$C(H) (X)—C$_6$H$_5$ (in the above formulas, X is a chlorine, bromine or iodine atom and R is an alkyl, aryl or aralkyl group containing 1 to 20 carbon atoms), etc.

The following may be mentioned as specific examples of the alkenyl-containing halogenated sulfonyl compound:

o-, m-, p-CH$_2$=CH—(CH$_2$)$_n$—C$_6$H$_4$—SO$_2$X, o-, m-, p-CH$_2$=CH—(CH$_2$)$_n$—O—C$_6$H$_4$—SO$_2$X (in the above formulas, X is a chlorine, bromine or iodine atom and n is an integer of 0 to 20); etc.

The above-mentioned crosslinking silyl-containing organic halide is not particularly restricted but includes, among others, compounds having a structure represented by the general formula 3:

$$R^4R^5C(X)-R^6-R^7-C(H)(R^3)-CH_2-[Si(R^9)_{2-b}(Y)_bO]_m-Si(R^{10})_{3-a}(Y)_a \quad (3)$$

(wherein R$^3$, R$^4$, R$^5$, R$^6$, R$^7$ and X are as defined above, R$^9$ and R$^{10}$ each represents an alkyl, aryl or aralkyl group containing 1 to 20 carbon atoms or a triorganosiloxy group represented by (R')$_3$SiO— (in which R' is a univalent hydrocarbon group containing 1 to 20 carbon atoms and the three R' groups may be the same or different) and, when there are two or more R$^9$ or R$^{10}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19 provided that the relation a+mb≧1 is satisfied).

Specific examples of the compound of general formula 3 are as follows:

XCH$_2$C(O)O(CH$_2$)$_n$Si(OCH$_3$)$_3$, CH$_3$C(H) (X)C(O)O(CH$_2$)$_n$Si(OCH$_3$)$_3$, (CH$_3$)$_2$C(X)C(O)O(CH$_2$)$_n$Si(OCH$_3$)$_3$, XCH$_2$C(O)O(CH$_2$)$_n$Si(CH$_3$) (OCH$_3$)$_2$,

CH$_3$C(H) (X)C(O)O(CH$_2$)$_n$Si(CH$_3$) (OCH$_3$)$_2$, (CH$_3$)$_2$C(X)C(O)O(CH$_2$)$_n$Si(CH$_3$) (OCH$_3$)$_2$ (in the above formulas, X is a chlorine, bromine or iodine atom and n is an integer of 0 to 20);

XCH$_2$C(O)O(CH$_2$)$_n$O(CH$_2$)$_m$Si(OCH$_3$)$_3$,

H$_3$CC(H) (X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$,

CH$_3$CH$_2$C(H) (X)C(O)O(CH$_2$)$_n$O(CH$_2$)$_m$Si(OCH$_3$)$_3$,

XCH$_2$C (O)O(CH$_2$)$_n$O(CH$_2$)$_m$—Si(CH$_3$) (OCH$_3$)$_2$,

H$_3$CC(H) (X)C(O)O(CH$_2$)$_n$O(CH$_2$)$_m$—Si(CH$_3$)(OCH$_3$)$_2$, (H$_3$C)$_2$C(X)C(O)O(CH$_2$)$_n$O(CH$_2$)$_m$—Si(CH$_3$) (OCH$_3$)$_2$,

CH$_3$CH$_2$C(H) (X)C(O)O(CH$_2$)$_n$O(CH$_2$)$_m$—Si(CH$_3$) (OCH$_3$)$_2$ (in the above formulas, X is a chlorine, bromine or iodine atom, n is an integer of 1 to 20 and m is an integer of 0 to 20);

o-, m-, p-XCH$_2$—C$_6$H$_4$—(CH$_2$)$_2$Si(OCH$_3$)$_3$, o-, m-,
p-CH$_3$C(H) (X)—C$_6$H$_4$—(CH$_2$)$_2$Si(OCH$_3$)$_3$, o-, m-,
p-CH$_3$CH$_2$C(H) (X)—C$_6$H$_4$—(CH$_2$)$_2$Si(OCH$_3$)$_3$, o-, m-,
p-XCH$_2$—C$_6$H$_4$—(CH$_2$)$_3$Si(OCH$_3$)$_3$, o-, m-,
p-CH$_3$C(H) (X)—C$_6$H$_4$—(CH$_2$)$_3$Si(OCH$_3$)$_3$, o-, m-,
p-CH$_3$CH$_2$C(H) (X)—C$_6$H$_4$—(CH$_2$)$_3$Si(OCH$_3$)$_3$, o-, m-,
p-XCH$_2$—C$_6$H$_4$—(CH$_2$)$_2$—O—(CH$_2$)$_3$Si(OCH$_3$)$_3$, o-, m-,
p-CH$_3$C(H) (X)—C$_6$H$_4$—(CH$_2$)$_2$—O—(CH$_2$)$_3$Si-(OCH$_3$)$_3$, o-, m-,
p-CH$_3$CH$_2$C(H) (X)—C$_6$H$_4$—(CH$_2$)$_2$—O—(CH$_2$)$_3$Si (OCH$_3$)$_3$, o-, m-,
p-XCH$_2$—C$_6$H$_4$—O—(CH$_2$)$_3$Si(OCH$_3$)$_3$, o-, m-,
p-CH$_3$C(H) (X)—C$_6$H$_4$—O—(CH$_2$)$_3$Si(OCH$_3$)$_3$, o-, m-,
p-CH$_3$CH$_2$C(H) (X)—C$_6$H$_4$—O—(CH$_2$)$_3$—Si(OCH$_3$)$_3$, o-, m-,
p-XCH$_2$—C$_6$H$_4$—O—(CH$_2$)$_2$—O—(CH$_2$)$_3$—Si-(OCH$_3$)$_3$, o-, m-,
p-CH$_3$C(H) (X)—C$_6$H$_4$—O—(CH$_2$)$_2$—O(CH$_2$)$_3$Si (OCH$_3$)$_3$, o-, m-,
p-CH$_3$CH$_2$C(H) (X)—C$_6$H$_4$—O—(CH$_2$)$_2$—O—(CH$_2$)$_3$ Si (OCH$_3$)$_3$ (in the above formulas, X is a chlorine, bromine or iodine atom); etc.

As further examples of the above-mentioned crosslinking silyl-containing organic halide, there may be mentioned compounds having a structure represented by the general formula 4:

$$(R^{10})_{3-a}(Y)_aSi-[OSi(R^9)_{2-b}(Y)_b]_m-CH_2-C(H)(R^3)-R^7-C(R^4)(X)-R^8-R^5 \quad (4)$$

(wherein R$^3$, R$^4$, R$^5$, R$^7$, R$^8$, R$^9$, R$^{10}$, a, b, m, X and Y are as defined above).

Specific examples of such compound are as follows:

(CH$_3$O)$_3$SiCH$_2$CH$_2$C(H) (X)C$_6$H$_5$, (CH$_3$O)$_2$(CH$_3$)SiCH$_2$CH$_2$C(H) (X)C$_6$H$_5$, (CH$_3$O)$_3$Si(CH$_2$)$_2$C(H) (X)—CO$_2$R, (CH$_3$O)$_2$(CH$_3$)Si(CH$_2$)$_2$C(H) (X)—CO$_2$R, (CH$_3$O)$_3$Si(CH$_2$)$_3$C(H) (X)—CO$_2$R, (CH$_3$O)$_2$(CH$_3$)Si(CH$_2$)$_3$C(H) (X)—CO$_2$R, (CH$_3$O)$_3$Si(CH$_2$)$_4$C(H) (X)—CO$_2$R, (CH$_3$O)$_2$(CH$_3$)Si(CH$_2$)$_4$C(H) (X)—CO$_2$R, (CH$_3$O)$_3$Si(CH$_2$)$_9$C(H) (X)—CO$_2$R, (CH$_3$O)$_2$(CH$_3$)Si(CH$_2$)$_9$C(H) (X)—CO$_2$, (CH$_3$O)$_3$Si(CH$_2$)$_3$C(H) (X)—C$_6$H$_5$, (CH$_3$O)$_2$(CH$_3$)Si(CH$_2$)$_3$C(H) (X)—C$_6$H$_5$, (CH$_3$O)$_3$Si(CH$_2$)$_4$C(H) (X)—C$_6$H$_5$, (CH$_3$O)$_2$(CH$_3$)Si(CH$_2$)$_4$C(H) (X)—C$_6$H$_5$ (in the above formulas, X is a chlorine, bromine or iodine atom and R is an alkyl, aryl or aralkyl group containing 1 to 20 carbon atoms); etc.

The above-mentioned hydroxyl-containing organic halide or halogenated sulfonyl compound is not particularly restricted but includes, for example, the following:

HO—(CH$_2$)$_n$—OC(O)C(H)(R)(X)

(wherein X is a chlorine, bromine or iodine atom, R is a hydrogen atom or an alkyl, aryl or aralkyl group containing 1 to 20 carbon atoms and n is an integer of 1 to 20).

The above-mentioned amino group-containing organic halide or halogenated sulfonyl compound is not particularly restricted but includes, for example, the following:

H$_2$N—(CH$_2$)$_n$—OC(O)C(H)(R)(X)

(wherein X is a chlorine, bromine or iodine atom, R is an alkyl, aryl or aralkyl group containing 1 to 20 carbon atoms and n is an integer of 1 to 20).

The above-mentioned epoxy-containing organic halide or halogenated sulfonyl compound is not particularly restricted but includes, for example, the following:

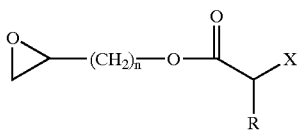

(wherein X is a chlorine, bromine or iodine atom, R is a hydrogen atom or an alkyl, aryl or aralkyl group containing 1 to 20 carbon atoms and n is an integer of 1 to 20).

For obtaining a polymer having two or more terminal structures according to the present invention in each molecule, an organic halide or halogenated sulfonyl compound having two or more initiation sites is preferably used as the initiator. As specific examples, there may be mentioned the following:

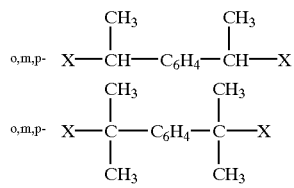

(in the above formulas, $C_6H_4$ is a phenylene group and X is a chlorine, bromine or iodine atom);

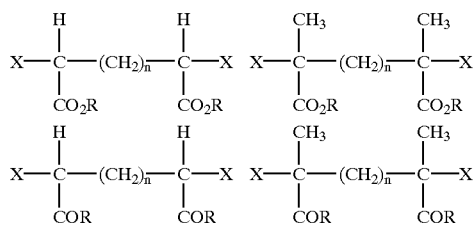

(in the above formulas, R is an alkyl, aryl or aralkyl group containing 1 to 20 carbon atoms, n is an integer of 0 to 20 and X is a chlorine, bromine or iodine atom);

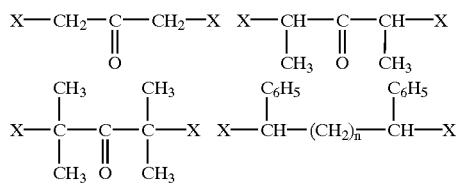

(in the above formulas, X is a chlorine, bromine or iodine atom and n is an integer of 0 to 20);

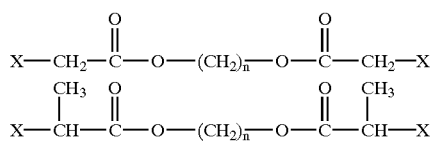

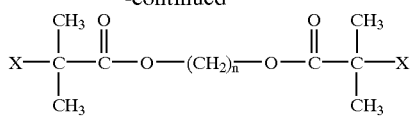

(in the above formulas, n is an integer of 1 to 20 and X is a chlorine, bromine or iodine atom);

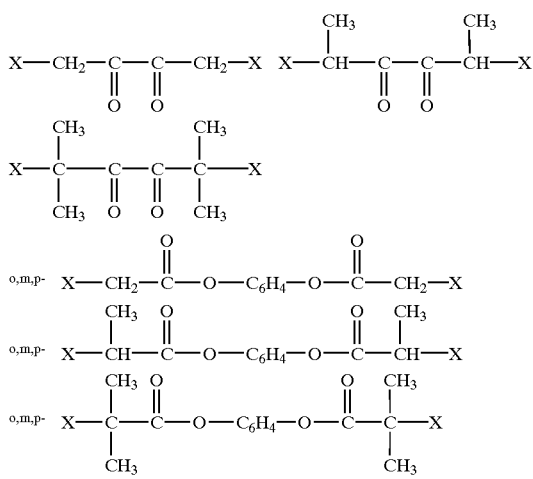

(in the above formulas, X is a chlorine, bromine or iodine atom); etc.

The vinyl monomers to be used in this polymerization are not particularly restricted but all those monomers mentioned hereinabove as examples can appropriately be used.

The transition metal complex to be used as the catalyst is not particularly restricted but preferably is a metal complex containing, as the main metal, an element of the group 7, 8, 9, 10 or 11 of the periodic table. More preferred are complexes of zero-valent copper, univalent copper, divalent ruthenium, divalent iron or divalent nickel. Copper complexes are preferred among others. Specific examples of the univalent copper compound to be used are cuprous chloride, cuprous bromide, cuprous iodide, cuprous cyanide, cuprous oxide and cuprous perchlorate. When such a copper compound is used, a ligand such as 2,2'-bipyridyl or a derivative thereof, 1,10-phenanthroline or a derivative thereof or a polyamine such as tetramethylethylenediamine, pentamethyldiethylenetriamine or hexamethyltris(2-aminoethyl)amine is added for increasing the catalytic activity. The tristriphenylphosphine complex of divalent ruthenium chloride ($RuCl_2(PPh_3)_3$) is also suited for use as the catalyst. When such a ruthenium compound is used as the catalyst, an aluminum alkoxide is added as an activator. Furthermore, the divalent iron-bistriphenylphosphine complex ($FeCl_2(PPh_3)_2$), the divalent nickel-bistriphenylphosphine complex ($NiCl_2(PPh_3)_2$), and the divalent nickel-bistributylphosphine complex ($NiBr_2(PBu_3)_2$) are also suited for use as the catalyst.

The polymerization can be carried out without using any solvent or in the presence of various solvents. As the solvent species, there may be mentioned hydrocarbon solvents such as benzene and toluene, ether solvents such as diethyl ether and tetrahydrofuran, halogenated hydrocarbon solvents such as methylene chloride and chloroform, ketone solvents such as acetone, methyl ethyl ketone and methyl isobutyl ketone, alcohol solvents such as methanol, ethanol, propanol, isopropanol, n-butyl alcohol and tert-butyl alcohol, nitrile solvents such as acetonitrile, propionitrile and benzonitrile, ester solvents such as ethyl acetate and butyl acetate, carbonate solvents such as ethylene carbonate and propylene carbonate, and the like. These may be used singly or two or more of them may be used in admixture. The polymerization can be carried out within the temperature range of 0° C. to 200° C., preferably 50 to 150° C., although it is not limited to such range.

Functional Groups

The crosslinking functional group in the vinyl polymer (I) is not restricted. Preferred as such are, however, crosslinking silyl, alkenyl, hydroxyl, amino, polymerizable carbon-carbon double bond, epoxy and like groups.

These crosslinking functional groups all can be used so as to adapt to the intended use/purpose.

Number of Crosslinking Functional Groups

The number of crosslinking functional groups in the vinyl polymer (I) is not particularly restricted but, for obtaining cured products with higher crosslinkability, it should be, on an average, not less than 1, preferably not less than 1.2, more preferably not less than 1.5.

Positions of Crosslinking Functional Groups

In cases where the foamed products resulting from foaming and curing of the curable composition of the present invention are especially required to have rubber-like properties, it is preferred that at least one of crosslinking functional groups be positioned at a terminus of the molecular chain so that the molecular weight between crosslinking sites, which has a great influence on the rubber elasticity, can be increased. More preferably, all crosslinking groups are located at molecular chain termini.

Methods of producing vinyl polymers, in particular (meth)acrylic polymers, having at least one crosslinking functional group such as mentioned above at a molecular terminus thereof are disclosed in Japanese Kokoku Publication Hei-03-14068, Japanese Kokoku Publication Hei-04-55444 and Japanese Kokai Publication Hei-06-211922, among others. However, these methods are free radical polymerization methods in which the above-mentioned "chain transfer agent methods" is used and, therefore, the polymers obtained generally have problems, namely they show a molecular weight distribution represented by Mw/Mn as wide as not less than 2 as well as a high viscosity, although they have crosslinking functional groups, in relatively high proportions, at molecular chain termini. Therefore, for obtaining vinyl polymers showing a narrow molecular weight distribution and a low viscosity and having crosslinking functional groups, in high proportions, at molecular chain termini, the above-described "living radical polymerization method" is preferably used.

In the following, an explanation is made of these functional groups.

Crosslinking Silyl Groups

As the crosslinking silyl groups to be used in the practice of the present invention, there may be mentioned those groups represented by the general formula 5:

$$-[Si(R^9)_{2-b}(Y)_b O]_m -Si(R^{10})_{3-a}(Y)_a \qquad (5)$$

{wherein, $R^9$ and $R^{10}$ each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' is a univalent hydrocarbon group containing 1 to 20 carbon atoms and the three R' groups may be the same or different) and, when there are two or more $R^9$ or $R^{10}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19, provided that the relation a+mb≧1 should be satisfied.}

As the hydrolyzable group, there may be mentioned, among others, a hydrogen atom and those groups which are in general use, for example alkoxy, acyloxy, ketoximate, amino, amido, aminoxy, mercapto and alkenyloxy groups. Among them, alkoxy, amido and aminoxy groups are preferred. In view of mild hydrolyzability and ease of handling, alkoxy groups are particularly preferred.

One to three hydroxyl groups and/or hydrolyzable groups can be bound to each silicon atom and, in the practice of the present invention, it is preferred that (a+Σb) be within the range of 1 to 5. When there are two or more hydrolyzable groups or hydroxyl groups in one crosslinking silyl group, they may be the same or different. The number of silicon atoms forming the crosslinking silyl group is not less than 1 and, in the case of silicon atoms connected by siloxane or like bonding, it is preferably not more than 20. Particularly preferred are crosslinking silyl groups represented by the general formula 6:

$$-Si(R^{10})_{3-a}(Y)_a \qquad (6)$$

(wherein $R^{10}$, Y and a are as defined above) because of ready availability.

Alkenyl Groups

The alkenyl group to be used in the practice of the invention is not particularly restricted but preferably is one represented by the general formula 7:

$$H_2C=C(R^{11})- \qquad (7)$$

(wherein $R^{11}$ is a hydrogen atom or a hydrocarbon group containing 1 to 20 carbon atoms).

In the general formula 7, $R^{11}$ is a hydrogen atom or a hydrocarbon group containing 1 to 20 carbon atoms, typical examples of which are the following:

$-(CH_2)_n-CH_3$, $-CH(CH_3)-(CH_2)_n-CH_3$, $-CH(CH_2CH_3)-(CH_2)_n-CH_3$, $-CH(CH_2CH_3)_2$, $-C(CH_3)_2-(CH_2)_n-CH_3$, $-C(CH_3)(CH_2CH_3)-(CH_2)_n-CH_3$, $-C_6H_5$, $-C_6H_5(CH_3)$, $-C_6H_5(CH_3)_2$, $-(CH_2)_n-C_6H_5$, $-(CH_2)_n-C_6H_5(CH_3)$, $-(CH_2)_n-C_6H_5(CH_3)_2$ (n being an integer of not less than 0 and the total number of carbon atoms in each group being not more than 20).

Among them, a hydrogen atom is preferred.

It is preferred, though not obligatory, that the alkenyl group in the polymer (I) be not activated by a carbonyl or alkenyl group or an aromatic ring, which is conjugated with the carbon-carbon double bond of the alkenyl group.

The mode of bonding of the alkenyl group to the polymer is not particularly restricted but preferably involves carbon-carbon bonding, ester bonding, carbonate bonding, amide bonding, urethane bonding or the like.

Amino Groups

In the practice of the invention, the amino group is not particularly restricted but includes groups represented by $$-NR^{12}_2$$

(wherein $R^{12}$ is a hydrogen atom or an organic group containing 1 to 20 carbon atoms and the two $R^{12}$ groups may be the same or different or may be bonded together at the respective other ends to form a ring structure). It may be an ammonium salt represented by $$-(NR^{12}_3)^+ X^-$$

(wherein $R^{12}$ is as defined above and $X^-$ is a counter anion), without any problem.

In the above formulas, $R^{12}$ is a hydrogen atom or a univalent organic group containing 1 to 20 carbon atoms and includes, among others, a hydrogen atom, alkyl groups containing 1 to 20 carbon atoms, aryl groups containing 6 to 20 carbon atoms, and aralkyl groups containing 7 to 20 carbon atoms. The two $R^{12}$ groups may be the same or different, or may be bonded together at the respective other ends to form a ring structure.

Polymerizable Carbon-carbon Double Bond

The groups containing polymerizable carbon-carbon double bond are preferably groups represented by the general formula 8:

(wherein $R^{13}$ represents a hydrogen atom or a univalent organic group containing 1 to 20 carbon atoms), more preferably a group of formula (8) in which $R^{13}$ is a hydrogen atom or a methyl group.

Specific examples of $R^{13}$ in general formula 8 include, but are not particularly limited to, —H, —CH$_3$, —CH$_2$CH$_3$, —(CH$_2$)$_n$CH$_3$ (n being an integer of 2 to 19), —C$_6$H$_5$, —CH$_2$OH, —CN and the like. Preferred are —H and —CH$_3$, however.

Functional Group Introduction Method

In the following, several methods of functional group introduction into the vinyl polymer (I) of the present invention are described without any purpose of restriction.

First, methods of crosslinking silyl, alkenyl or hydroxyl group introduction by terminal functional group conversion are described. These functional groups each can serve as a precursor of another and, therefore, mention is made in the order from crosslinking silyl groups to respective precursors.

As methods of synthesizing vinyl polymers having at least one crosslinking silyl group, there may be mentioned, among others, (A) the method which comprises subjecting a crosslinking silyl group-containing hydrosilane compound to addition to a vinyl polymer having at least one alkenyl group in the presence of a hydrosilylation catalyst, (B) the method which comprises reacting a vinyl polymer having at least one hydroxyl group with a compound having, in each molecule, a crosslinking silyl group and a group capable of reacting with the hydroxyl group, such as an isocyanato group, (C) the method which comprises subjecting a compound having, in each molecule, a polymerizable alkenyl group and a crosslinking silyl group to reaction in synthesizing a vinyl polymer by radical polymerization, (D) the method which comprises using a crosslinking silyl group-containing chain transfer agent in synthesizing a vinyl polymer by radical polymerization, and (E) the method which comprises reacting a vinyl polymer having at least one highly reactive carbon-halogen bond with a compound having, in each molecule, a crosslinking silyl group and a stable carbanion.

The vinyl polymer having at least one alkenyl group, which is to be used in the above method (A), can be obtained by various methods. Several methods of synthesis are mentioned below, without any purpose of restriction, however.

(A-a) Method comprising subjecting to reaction a compound having, in each molecule, a polymerizable alkenyl group together with a low polymerizability alkenyl group, such as one represented by the general formula 9 shown below as a second monomer in synthesizing a vinyl polymer by radical polymerization:

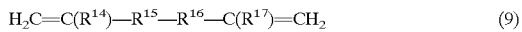

(wherein $R^{14}$ represents a hydrogen atom or a methyl group, $R^{15}$ represents —C(O)O— or an o-, m- or p-phenylene group, $R^{16}$ represents a direct bond or a divalent organic group containing 1 to 20 carbon atoms, which may contain one or more ether bonds, and $R^{17}$ represents a hydrogen atom, an alkyl group containing 1 to 20 carbon atoms, an aryl group containing 6 to 20 carbon atoms or an aralkyl group containing 7 to 20 carbon atoms).

The time when the compound having, in each molecule, a polymerizable alkenyl group together with a low polymerizability alkenyl group is subjected to reaction is not particularly restricted but, in particular in living radical polymerization and when rubber-like properties are expected, the compound is preferably subjected to reaction as a second monomer at the final stage of the polymerization reaction or after completion of the reaction of the employed monomers.

(A-b) Method comprising subjecting to reaction a compound having at least two low polymerizability alkenyl groups, for example 1,5-hexadiene, 1,7-octadiene or 1,9-decadiene, at the final stage of the polymerization or after completion of the reaction of the monomers employed in vinyl polymer synthesis by living radical polymerization.

(A-c) Method comprising reacting a vinyl polymer having at least one highly reactive carbon-halogen bond with one of various alkenyl-containing organometallic compounds, for example an organotin such as allyltributyltin or allyltrioctyltin, for substitution of the halogen.

(A-d) Method comprising reacting a vinyl polymer having at least one highly reactive carbon-halogen bond with a stabilized, alkenyl-containing carbanion such as one represented by the general formula 10, for substitution of the halogen:

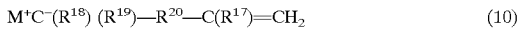

(wherein $R^{17}$ is as defined above, $R^{18}$ and $R^{19}$ each is an electron-withdrawing group capable of stabilizing the carbanion $C^-$ or one of them is such an electron-withdrawing group and the other represents a hydrogen atom, an alkyl group containing 1 to 10 carbon atoms or a phenyl group, $R^{20}$ represents a direct bond or a divalent organic group containing 1 to 10 carbon atoms, which may contain one or more ether bonds, and $M^+$ represents an alkali metal ion or a quaternary ammonium ion).

Particularly preferred as the electron-withdrawing group $R^{18}$ and/or $R^{19}$ are those which have a structure of —CO$_2$R, —C(O)R or —CN.

(A-e) Method comprising reacting a vinyl polymer having at least one highly reactive carbon-halogen bond with a simple substance metal, such as zinc, or an organometallic compound and then reacting the thus-prepared enolate anion with an alkenyl-containing, electrophilic compound, such as an alkenyl-containing compound having a leaving group such as a halogen atom or an acetyl group, an alkenyl-containing carbonyl compound, an alkenyl-containing isocyanate compound or an alkenyl-containing acid halide.

(A-f) Method comprising reacting a vinyl polymer having at least one highly reactive carbon-halogen bond with an alkenyl-containing oxy anion or carboxylate anion such as one represented by the general formula (11) or (12), for substitution of the halogen:

(wherein $R^{17}$ and $M^+$ are as defined above and $R^{21}$ is a divalent organic group containing 1 to 20 carbon atoms, which may contain one or more ether bonds);

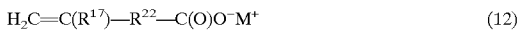

(wherein $R^{17}$ and $M^+$ are as defined above and $R^{22}$ is a direct bond or a divalent organic group containing 1 to 20 carbon atoms, which may contain one or more ether bonds).

The method of synthesizing the above-mentioned vinyl polymer having at least one highly reactive carbon-halogen bond includes, but is not limited to, atom transfer radical polymerization methods using an organic halide or the like as initiator and a transition metal complex as catalyst, as mentioned above.

It is also possible to obtain the vinyl polymer having at least one alkenyl group from a vinyl polymer having at least one hydroxyl group. As utilizable methods, there may be mentioned, for example, the following, without any purpose of restriction.

(A-g) Method comprising reacting the hydroxyl group of a vinyl polymer having at least one hydroxyl group with a base, such as sodium methoxide, followed by reaction with an alkenyl-containing halide, such as allyl chloride.

(A-h) Method comprising reacting such hydroxyl group with an alkenyl-containing isocyanate compound, such as allyl isocyanate.

(A-i) Method comprising reacting such hydroxyl group with an alkenyl-containing acid halide, such as (meth) acrylic acid chloride, in the presence of a base, such as pyridine.

(A-j) Method comprising reacting such hydroxyl group with an alkenyl-containing carboxylic acid, such as acrylic acid, in the presence of an acid catalyst.

In the practice of the present invention, when no halogen is directly involved in the alkenyl group introduction, as in the method (A-a) or (A-b), the vinyl polymer is preferably synthesized by living radical polymerization. From the viewpoint of ready controllability, the method (A-b) is more preferred.

In cases where alkenyl group introduction is effected by conversion of the halogen atom of a vinyl polymer having at least one highly reactive carbon-halogen atom, use is preferably made of a vinyl polymer having at least one terminal carbon-halogen bond, which is highly reactive, as obtained by subjecting a vinyl monomer to radical polymerization (atom transfer radical polymerization) using, as an initiator, an organic halide or halogenated sulfonyl compound having at least one highly reactive carbon-halogen bond and, as a catalyst, a transition metal complex. In view of easier controllability, the method (A-f) is more preferred.

The crosslinking silyl group-containing hydrosilane compound is not particularly restricted but includes, as typical examples, compounds represented by the general formula 13 given below.

$$H\text{—}[Si(R^9)_{2-b}(Y)_bO]_m\text{—}Si(R^{10})_{3-a}(Y)_a \qquad (13)$$

{wherein $R^9$ and $R^{10}$ each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO$— (in which R' is a univalent hydrocarbon group containing 1 to 20 carbon atoms and the three R' groups may be the same or different) and, when there are two or more $R^9$ or $R^{10}$ groups, they may be the same or different; Y represents a hydroxyl group or a hydrolyzable group and, when there are two or more Y groups, they may be the same or different; a represents 0, 1, 2 or 3, b represents 0, 1 or 2 and m is an integer of 0 to 19, provided that the relation a+mb≧1 should be satisfied}.

Particularly preferred among those hydrosilane compounds in view of ready availability are crosslinking group-containing compounds represented by the general formula 14:

$$H\text{—}Si(R^{10})_{3-a}(Y)_a \qquad (14)$$

(wherein $R^{10}$, Y and a are as defined above).

In subjecting the above crosslinking silyl-containing hydrosilane compound to addition to the alkenyl group, a transition metal catalyst is generally used. The transition metal catalyst includes, among others, simple substance platinum, solid platinum dispersed on a support such as alumina, silica or carbon black, chloroplatinic acid, chloroplatinic acid complexes with alcohols, aldehydes, ketones or the like, platinum-olefin complexes, and platinum(0)-divinyltetramethyldisiloxane complex. As other catalysts than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$, for instance.

The method of producing the vinyl polymer having at least one hydroxyl group, which polymer is to be used in the methods (B) and (A-g) to (A-j), includes, but is not limited to, the following, among others.

(B-a) Method comprising subjecting to reaction, as a second monomer, a compound having both a polymerizable alkenyl group and a hydroxyl group in each molecule, for example one represented by the general formula 15 given below, in synthesizing the vinyl polymer by radical polymerization:

$$H_2C\text{=}C(R^{14})\text{—}R^{15}\text{—}R^{16}\text{—}OH \qquad (15)$$

(wherein $R^{14}$, $R^{15}$ and $R^{16}$ are as defined above).

The time for subjecting to reaction the compound having both a polymerizable alkenyl group and a hydroxyl group in each molecule is not critical but, in particular in living radical polymerization, when rubber-like properties are demanded, the compound is preferably subjected to reaction as a second monomer at the final stage of the polymerization reaction or after completion of the reaction of the employed monomer.

(B-b) Method comprising subjecting an alkenyl alcohol, such as 10-undecenol, 5-hexenol or allyl alcohol, to reaction at the final stage of polymerization reaction or after completion of the reaction of the employed monomer in synthesizing the vinyl polymer by living radical polymerization.

(B-c) Method comprising radical-polymerizing a vinyl monomer using a hydroxyl-containing chain transfer agent, such as a hydroxyl-containing polysulfide, in large amounts, as described in Japanese Kokai Publication Hei-05-262808, for instance.

(B-d) Method comprising subjecting a vinyl monomer to radical polymerization using hydrogen peroxide or a hydroxyl-containing initiator, as described in Japanese Kokai Publication Hei-06-239912 and Japanese Kokai Publication Hei-08-283310, for instance.

(B-e) Method comprising subjecting a vinyl monomer to radical polymerization using an alcohol in excess, as described in Japanese Kokai Publication Hei-06-116312, for instance.

(B-f) Method comprising introducing a terminal hydroxyl group by hydrolyzing the halogen atom of a vinyl polymer having at least one highly reactive carbon-halogen bond or reacting such halogen atom with a hydroxyl-containing compound, according to the method described in Japanese Kokai Publication Hei-04-132706, for instance.

(B-g) Method comprising reacting a vinyl polymer having at least one highly reactive carbon-halogen bond with a hydroxyl-containing stabilized carbanion, such as one represented by the general formula 16 for substitution of the halogen atom:

$$M^+C^-(R^{18})(R^{19})\text{—}R^{20}\text{—}OH \qquad (16)$$

(wherein $R^{18}$, $R^{19}$ and $R^{20}$ are as defined above).

Particularly preferred as the electron-withdrawing groups $R^{18}$ and $R^{19}$ are those having a structure of —$CO_2R$, —C(O)R or —CN.

(B-h) Method comprising reacting a vinyl polymer having at least one highly reactive carbon-halogen bond with a simple substance metal, such as zinc, or an organometallic compound and then reacting the thus-prepared enolate anion with an aldehyde or ketone.

(B-i) Method comprising reacting a vinyl polymer having at least one highly reactive carbon-halogen bond with a hydroxyl-containing oxy anion or carboxylate anion, such as one represented by the general formula 17 or 18 given below, for substitution of the halogen atom:

$$HO—R^{21}—O^-M^+ \quad (17)$$

(wherein $R^{21}$ and $M^+$ are as defined above);

$$HO—R^{22}—C(O)O^-M^+ \quad (18)$$

(wherein $R^{22}$ and $M^+$ are as defined above).

(B-j) Method comprising subjecting, as a second monomer, a compound having a low polymerizable alkenyl group and a hydroxyl group in each molecule to reaction at the final stage of the polymerization reaction or after completion of the reaction of the employed monomer in synthesizing the vinyl polymer by living radical polymerization.

Such compound is not particularly restricted but may be a compound represented by the general formula 19, for instance:

$$H_2C=C(R^{14})—(R^{21})—OH \quad (19)$$

(wherein $R^{14}$ and $R^{21}$ are as defined above).

The compound represented by the above general formula 19 is not particularly restricted but, in view of ready availability, alkenyl alcohols such as 10-undecenol, 5-hexenol and allyl alcohol are preferred.

In the practice of the present invention, when no halogen is directly involved in hydroxyl group introduction, as in the methods (B-a) to (B-e) and (B-j), the vinyl polymer is preferably synthesized by living radical polymerization. The method (B-b) is more preferred from the viewpoint of ease of control.

In cases where hydroxyl group introduction is effected by conversion of the halogen atom of a vinyl polymer having at least one highly reactive carbon-halogen atom, use is preferably made of a vinyl polymer having at least one terminal carbon-halogen bond, which is highly reactive, as obtained by subjecting a vinyl monomer to radical polymerization (atom transfer radical polymerization) using an organic halide or halogenated sulfonyl compound as an initiator and, as a catalyst, a transition metal complex. From the viewpoint of ease of control, the method (B-i) is more preferred.

As the compound having a crosslinking silyl group and a group capable of reacting with a hydroxyl group, such as an isocyanato group, in each molecule, there may be mentioned, for example, γ-isocyanatopropyltrimethoxysilane, γ-isocyanatopropylmethyldimethoxysialne, γ-isocyanatopropyltriethoxysilane and the like. If necessary, any of urethane formation reaction catalysts generally known in the art can be used.

The compound having both a polymerizable alkenyl group and a crosslinking silyl group in each molecule, which is to be used in the method (C), includes, among others, trimethoxysilylpropyl (meth)acrylate, methyldimethoxysilylpropyl (meth)acrylate and like compounds represented by the general formula 20:

$$H_2C=C(R^{14})—R^{15}—R^{23}—[Si(R^9)_{2-b}(Y)_b O]_m—Si(R^{10})_{3-a}(Y)_a \quad (20)$$

(wherein $R^9$, $R^{10}$, $R^{14}$, $R^{15}$, Y, a, b and m are as defined above and $R^{23}$ is a direct bond or a divalent organic group containing 1 to 20 carbon atoms, which may contain one or more ether bonds).

The time for subjecting the compound having both a polymerizable alkenyl group and a crosslinking silyl group in each molecule is not critical but, in particular in living radical polymerization and when rubber-like properties are demanded, the compound is preferably subjected to reaction as a second monomer at the final stage of the polymerization reaction or after completion of the reaction of the employed monomer.

As the crosslinking silyl-containing chain transfer agent to be used in the chain transfer agent method (D), there may be mentioned crosslinking silyl-containing mercaptans and crosslinking silyl-containing hydrosilanes, as described in Japanese Kokoku Publication Hei-03-14068 and Japanese Kokoku Publication Hei-04-55444, among others.

The method of synthesizing the vinyl polymer having at least one highly reactive carbon-halogen bond, which is to be used in the method (E), includes, but is not limited to, the atom transfer radical polymerization method which uses an organic halide or the like as an initiator and a transition metal complex as a catalyst. As the compound having both a crosslinking silyl group and a stabilized carbanion in each molecule, there may be mentioned compounds represented by the general formula 21:

$$M^+C^-(R^{18})(R^{19})—R^{24}—C(H)(R^{25})—CH_2—[Si(R^9)_{2-b}(Y)_b O]_m—Si(R^{10})_{3-a}(Y)_a \quad (21)$$

(wherein $R^9$, $R^{10}$, $R^{18}$, $R^{19}$, Y, a, b and m are as defined above, $R^{24}$ is a direct bond or a divalent organic group containing 1 to 10 carbon atoms, which may contain one or more ether bonds, and $R^{25}$ represents a hydrogen atom, an alkyl group containing 1 to 10 carbon atoms, an aryl group containing 6 to 10 carbon atoms or an aralkyl group containing 7 to 10 carbon atoms).

Particularly preferred as the electron-withdrawing groups $R^{18}$ and $R^{19}$ are those having a structure of —$CO_2R$, —C(O)R or —CN.

Epoxy Group

In the practice of the present invention, the vinyl polymer having a terminal reactive functional group is produced by the following steps, though mentioning thereof has no restrictive meaning:

(1) producing a vinyl polymer by polymerizing vinyl monomers by living radical polymerization; and then (2) reacting the polymer with a compound having a reactive functional group and an ethylenically unsaturated group.

Mention may also be made of the method comprising subjecting allyl alcohol to reaction at the final stage of atom transfer radical polymerization and then causing epoxy ring formation from the hydroxyl and halogen groups.

Amino Group

The method of producing the vinyl polymer having at least one main chain terminal amino group may comprise the following steps:

(1) producing a vinyl polymer having at least one main chain terminal halogen group; and (2) converting the terminal halogen group to an amino-containing substituent using an amino-containing compound.

The amino-containing substituent is not particularly restricted but includes, for example, groups represented by the general formula 22:

$$-O-R^{26}-NR^{12}{}_2 \quad (22)$$

(wherein $R^{26}$ represents a divalent organic group containing 1 to 20 carbon atoms, which may contain one or more ether or ester bonds; R represents a hydrogen atom or a univalent organic group containing 1 to 20 carbon atoms and the two $R^{12}$ groups may be the same or different or may be bonded together at the respective other ends to form a ring structure).

In the above general formula 22, $R^{26}$ is a divalent organic group containing 1 to 20 carbon atoms, which may contain one or more ether or ester bonds and includes, among others, alkylene groups containing 1 to 20 carbon atoms, arylene groups containing 6 to 20 carbon atoms and aralkylene groups containing 7 to 20 carbons atoms and, preferably, groups represented by:

$$-C_6H_4-R^{27}-$$

(wherein $C_6H_4$ represents a phenylene group and $R^{27}$ represents a direct bond or a divalent organic group containing 1 to 14 carbon atoms, which may contain one or more ether or ester bonds) or $$-C(O)-R^{28}-$$

(wherein $R^{28}$ represents a direct bond or a divalent organic group containing 1 to 19 carbon atoms, which may contain one or more ether or ester bonds.

An amino group can be introduced into a polymer terminus by converting a terminal halogen of the vinyl polymer. The method of substitution is not particularly restricted but, from the viewpoint of ease of reaction control, a nucleophilic substitution reaction using an amino-containing compound as a nucleophilic agent is preferred. As such nucleophilic agent, there may be mentioned compounds having both a hydroxyl group and an amino group as represented by the general formula 23:

$$HO-R^{26}-NR^{12}{}_2 \quad (23)$$

(wherein $R^{26}$ represents a divalent organic group containing 1 to 20 carbon atoms, which may contain one or more ether or ester bonds; $R^{12}$ represents a hydrogen atom or a univalent organic group containing 1 to 20 carbon atoms and the two $R^{12}$ groups may be the same or different or may be bonded together at the respective other ends to form a ring structure).

In the above general formula 23, $R^{26}$ is a divalent organic group containing 1 to 20 carbon atoms, which may contain one or more ether or ester bonds, and includes, for example, alkylene groups containing 1 to 20 carbon atoms, arylene groups containing 6 to 20 carbons and aralkylene groups containing 7 to 20 carbon atoms. Among these compounds having both a hydroxyl group and an amino group, aminophenols of the above general formula in which $R^{26}$ is represented by $$-C_6H_4-R^{27}-$$

(wherein $C_6H_4$ represents a phenylene group and $R^{27}$ represents a direct bond or a divalent organic group containing 1 to 14 carbon atoms, which may contain one or more ether or ester bonds);

and amino acids of the above formula in which $R^{26}$ is represented by $$-C(O)-R^{28}-$$

(wherein $R^{28}$ represents a direct bond or a divalent organic group containing 1 to 19 carbon atoms, which may contain one or more ether or ester bonds) are preferred.

As specific compounds, there may be mentioned, among others, ethanolamine: o-, m- or p-aminophenol; o-, m- or p-$NH_2$—$C_6H_4$—$CO_2H$; glycine, alanine and aminobutanoic acid.

A compound having both an amino group and an oxy anion can be used as the nucleophilic agent. Such compound is not particularly restricted but includes, for example, compounds represented by the general formula 24:

$$M^+O^-—R^{26}—NR^{12}{}_2 \quad (24)$$

(wherein $R^{26}$ represents a divalent organic group containing 1 to 20 carbon atoms, which may contain one or more ether or ester bonds; $R^{12}$ represents a hydrogen atom or a univalent organic group containing 1 to 20 carbon atoms and the two $R^{12}$ groups may be the same or different or may be bonded together at the respective other ends to form a ring structure; and $M^+$ represents an alkali metal ion or a quaternary ammonium ion).

In the above general formula 24, $M^+$ is a counter cation to the oxy anion and represents an alkali metal ion or a quaternary ammonium ion. The above alkali metal ion includes the lithiumion, sodium ion, potassium ion, etc., and preferably is the sodium ion or potassium ion. The above quaternary ammonium ion includes the tetramethylammonium ion, tetraethylammonium ion, trimethylbenzylammonium ion, trimethyldodecylammonium ion, tetrabutylammonium ion, dimethylpiperidinium ion, etc.

Among the above-mentioned compounds having both an amino group and an oxy anion, salts of aminophenols represented by the general formula 25 given below or salts of amino acids represented by the general formula 26 given below are preferred in view of the ease of control of the substitution reaction and their ready availability:

$$M^+O^-—C_6H_4—R^{27}—NR^{12}{}_2 \quad (25)$$

$$M^+O^-—C(O)—R^{28}—NR^{12}{}_2 \quad (26)$$

(wherein $C_6H_4$ represents a phenylene group, $R^2$ represents a direct bond or a divalent organic group containing 1 to 14 carbon atoms, which may contain one or more ether or ester bonds; $R^3$ represents a direct bond or a divalent organic group containing 1 to 19 carbon atoms, which may contain one or more ether or ester bonds; $R^{12}$ represents a hydrogen atom or a univalent organic group containing 1 to 20 carbon atoms and the two $R^{12}$ groups may be the same or different or may be bonded together at the respective other ends to form a ring structure; and $M^+$ is as defined above).

The oxy anion-containing compound represented by the general formula 24, 25 or 26can be obtained with ease by reacting a compound represented by the general formula 23 with a basic compound.

Various compounds can be used as the basic compound. Examples are sodium methoxide, potassium methoxide, lithium methoxide, sodium ethoxide, potassium ethoxide, lithium ethoxide, sodium t-butoxide, potassium t-butoxide, sodium carbonate, potassium carbonate, lithium carbonate, sodium hydrogen carbonate, sodium hydroxide, potassium hydroxide, sodium hydride, potassium hydride, methyllithium, ethyllithium, n-butyllithium, t-butyllithium, lithiumdiisopropylamide, lithiumhexamethyldisilazide, and the like. The amount of the above base is not particularly restricted but generally is 0.5 to 5 equivalents, preferably 0.8 to 1.2 equivalents, relative to the above precursor.

As the solvent to be used in reacting the above precursor with the above base, there may be mentioned, among others, hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and t-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; and sulfoxide solvents such as dimethyl sulfoxide. These may be used singly or two or more of them may be used in admixture.

The oxy anion-containing compound in which $M^+$ is a quaternary ammonium ion can be obtained by preparing the corresponding compound in which $M^+$ is an alkali metal ion and reacting the same with a quaternary ammonium halide. As example of the quaternary ammonium halide, there may be mentioned tetramethylammonium halides, tetraethylammonium halides, trimethylbenzylammonium halides, trimethyldodecylammonium halides, tetrabutylammonium halides, etc.

Various solvents may be used in the reaction for the substitution of the polymer terminal halogen. As examples, there may be mentioned hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and t-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; and sulfoxide solvents such as dimethyl sulfoxide. These may be used singly or in the form of a mixture of two or more.

The reaction can be carried out at a temperature of 0 to 150° C. The amount of the amino-containing compound is not particularly restricted but generally is 1 to 5 equivalents, preferably 1 to 1.2 equivalents, relative to the polymer terminal halogen.

A basic compound may be added to the reaction mixture for promoting the nucleophilic substitution reaction. As such basic compound, there may be mentioned those already mentioned hereinabove as well as alkylamines such as trimethylamine, triethylamine and tributylamine; polyamines such as tetramethylethylenediamine and pentamethyldiethylenetriamine; pyridine compounds such as pyridine and picoline, and so on.

In cases where the amino group in the amino-containing compound used in the nucleophilic substitution reaction affects the nucleophilic substitution reaction, the amino group is preferably protected with an appropriate substituent. Such substituent includes, among others, benzyloxycarbonyl, t-butoxycarbonyl and 9-fluorenylmethoxycarbonyl.

Mention may further be made of the method comprising substituting a halogen terminus of a vinyl polymer with an azido anion and then reducing the same with LAH or the like.

Polymerizable Carbon-carbon Double Bond

The method of introducing a polymerizable carbon-carbon double bond the polymer (I) according to the invention is not particularly restricted but may be any of the following:

(1) The method comprising substituting a compound having a radical-polymerizable carbon-carbon double bond for a halogen group of a vinyl polymer. A specific method comprises reacting a vinyl polymer having a structure represented by the general formula 27:

$$—CR^{29}R^{30}X \qquad (27)$$

(wherein $R^{29}$ and $R^{30}$ represents a group bonded to an ethylenic unsaturated group of the vinyl monomer and X represents a chlorine, bromine or iodine atom) with a compound represented by the general formula 28:

$$M^+{}^-OC(O)C(R^{13})=CH_2 \qquad (28)$$

(wherein $R^{13}$ represents a hydrogen atom or an organic group containing 1 to 20 carbon atoms and $M^+$ represents an alkali metal ion or a quaternary ammonium ion).

(2) The method comprising reacting a hydroxyl-containing vinyl polymer with a compound represented by the general formula 29:

$$XC(O)C(R^{13})=CH_2 \qquad (29)$$

(wherein $R^{13}$ represents a hydrogen atom or an organic group containing 1 to 20 carbon atoms and X represents a chlorine or bromine atom or a hydroxyl group).

(3) The method comprising reacting a hydroxyl-containing vinyl polymer with a diisocyanate compound and then reacting the residual isocyanate group with a compound represented by the general formula 30:

$$HO—R^{31}—OC(O)C(R^{13})=CH_2 \qquad (30)$$

(wherein $R^{13}$ represents a hydrogen atom or an organic group containing 1 to 20 carbon atoms and $R^{31}$ represents a divalent organic group containing 2 to 20 carbon atoms).

In the following, these methods are described in detail.

The above method (1) is described.

(1) The method comprising reacting a vinyl polymer having a terminal structure represented by the general formula 27:

$$—CR^{29}R^{30}X \qquad (27)$$

(wherein $R^{29}$ and $R^{30}$ represents a group bonded to an ethylenic unsaturated group of the vinyl monomer and X represents a chlorine, bromine or iodine atom) with a compound represented by the general formula 28:

$$M^+{}^-OC(O)C(R^{13})=CH_2 \qquad (28)$$

(wherein $R^{13}$ represents a hydrogen atom or an organic group containing 1 to 20 carbon atoms and $M^+$ represents an alkali metal ion or a quaternary ammonium ion).

The vinyl polymer having a terminal structure represented by the general formula 27 is produced by the method comprising polymerizing vinyl monomers using the above-described organic halide or halogenated sulfonyl compound as an initiator and the transition metal complex as a catalyst, or by the method comprising polymerizing vinyl monomers using a halogen compound as a chain transfer agent, preferably by the former method.

The compound represented by the general formula 28 is not particularly restricted but, as specific examples of $R^{13}$, there may be mentioned —H, —$CH_3$, —$CH_2CH_3$, —$(CH_2)_n CH_3$ (n being an integer of 2 to 19), —$C_6H_5$, —$CH_2OH$, —CN and the like. Among them, H and —$CH_3$ are preferred. $M^+$ is the counter cation to the oxy anion and includes alkali metal ions, specifically such as lithium ion, sodium ion and potassium ion, and quaternary ammonium ions. As the quaternary ammonium ions, there may be mentioned the tetramethylammonium ion, tetraethylammonium ion, tetrabenzylammonium ion, trimethyldodecylammonium ion, tetrabutylammonium ion and dimethylpiperidinium ion, etc. The sodium ion and potassium ion are preferred, however. The oxy anion of general formula 28 is used preferably in an amount of 1 to 5 equivalents, more preferably 1.0 to 1.2 equivalents, relative to the halogen group of general formula 27. The solvent to be used in carrying out this reaction is not particularly restricted but preferably is a polar solvent since the reaction is a nucleophilic substitution reaction. Thus usable are tetrahydrofuran, dioxane, diethyl ether, acetone, dimethyl sulfoxide, dimethylformamide, dimethylacetamide, hexamethylphosphoric triamide, acetonitrile and the like. The temperature for carrying out the reaction is not particularly restricted but, generally, the reaction is carried out at 0 to 150° C., preferably at room temperature to 100° C. so that the polymerizable terminal group may be retained.

The above-mentioned method (2) is described.

(2) The method comprising reacting a hydroxyl-containing vinyl polymer with a compound represented by the general formula 29:

$$XC(O)C(R^{13})=CH_2 \quad (29)$$

(wherein $R^{13}$ represents a hydrogen atom or an organic group containing 1 to 20 carbon atoms and X represents a chlorine or bromine atom or a hydroxyl group).

The compound represented by the general formula 29 is not particularly restricted but, as specific examples of $R^{13}$, there maybe mentioned —H, —CH$_3$, —CH$_2$CH$_3$, (CH$_2$)$_n$CH$_3$ (n being an integer of 2 to 19), —C$_6$H$_5$, —CH$_2$OH, —CN and the like. Among them, H and —CH$_3$ are preferred.

The vinyl polymer having a hydroxyl group, preferably at a terminus, is produced by the method comprising polymerizing vinyl monomers using the above-mentioned organic halide or halogenated sulfonyl compound as an initiator and the transition metal complex as a catalyst, or by the method comprising polymerizing vinyl monomers using a hydroxyl-containing compound as a chain transfer agent, preferably by the former method. Such method of producing a hydroxyl-containing vinyl polymers includes, but is not limited to, the following:

(a) The method comprising subjecting a compound having both a polymerizable alkenyl group and a hydroxyl group in each molecule as represented by the general formula 31, for instance:

$$H_2C=C(R^{32})—R^{33}—R^{34}—OH \quad (31)$$

(wherein $R^{32}$ is an organic group containing 1 to 20 carbon atoms but preferably is a hydrogen atom or a methyl group, and may be the same or different; $R^{33}$ represents —C(O)O— (ester group) or an o-, m- or p-phenylene group; $R^{34}$ represents a direct bond or a divalent organic group containing 1 to 20 carbon atoms, which may contain one or more ether bonds; the compound being a (meth)acrylate compound when $R^{33}$ is an ester group, or a styrenic compound when $R^{33}$ is a phenylene group) to reaction as a second monomer in synthesizing a vinyl polymer by living radical polymerization.

The time for subjecting the compound having both a polymerizable alkenyl group and a hydroxyl group in each molecule is not critical but, in particular when rubber-like properties are demanded, the compound is preferably subjected to reaction as a second monomer at the final stage of the polymerization reaction or after completion of the reaction of the employed monomer.

(b) The method comprising subjecting a compound having a low-polymerizability alkenyl group and a hydroxyl group in each molecular to reaction as a second monomer in synthesizing a vinyl polymer by living radical polymerization at the final stage of the polymerization reaction or after completion of the reaction of the employed monomer.

Such compound is not particularly restricted but includes, among others, compounds represented by the general formula 32:

$$H_2C=C(R^{32})—R^{35}—OH \quad (32)$$

(wherein $R^{32}$ is as defined above; $R^{35}$ represents a divalent organic group containing 1 to 20 carbon atoms, which may contain one or more ether bonds).

The compound represented by the general formula 32 is not particularly restricted but preferably includes alkenyl alcohols such as 10-undecenol, 5-hexenol and ally alcohol because of their ready availability.

(c) The method of introducing a hydroxyl group at a terminus which comprises hydrolyzing, or reacting with a hydroxyl-containing compound, the halogen of a vinyl polymer having at least one carbon-halogen bond such as one represented by the general formula 27, as obtained by atom transfer radical polymerization, as disclosed in Japanese Kokai Hei-04-132706 and elsewhere.

(d) The method involving halogen substitution which comprises reacting a vinyl polymer having at least one carbon-halogen bond such as one represented by the general formula 27, as obtained by atom transfer radical polymerization, with a hydroxyl-containing stabilized carbanion such as one represented by the general formula 33:

$$M^+C^-(R^{36})(R^{37})—R^{35}—OH \quad (33)$$

(wherein $R^{35}$ is as defined above; $R^{36}$ and $R^{37}$ each represents an electron-withdrawing group capable of stabilizing the carbanion C$^-$ or one of them represents such an electron-withdrawing group and the other represents a hydrogen atom or an alkyl group containing 1 to 10 carbon atoms or a phenyl group. As the electron-withdrawing groups $R^{36}$ and $R^3$, there may be mentioned —CO$_2$R (ester group), —C(O)R (keto group), —CON(R$_2$) (amide group), —COSR (thioester group), —CN (nitrile group), —NO$_2$ (nitro group), etc. The substituent R is an alkyl group containing 1 to 20 carbon atoms, an aryl group containing 6 to 20 carbon atoms or an aralkyl group containing 7 to 20 carbon atoms, preferably an alkyl group containing 1 to 10 carbon atoms or a phenyl group. Particularly preferred as $R^{36}$ and $R^{37}$ are —CO$_2$R, —C(O)R and —CN.)

(e) The method comprising reacting a vinyl polymer obtained by atom transfer radical polymerization and having at least one carbon-halogen bond such as one represented by the general formula 27 with a single substance metal, such as zinc, or an organometallic compound and then reacting the thus-prepared enolate anion with an aldehyde or ketone.

(f) The method comprising reacting a vinyl polymer having at least one polymer terminal halogen, preferably a halogen group represented by the general formula 27, with a hydroxyl-containing oxy anion represented by the general formula 34 shown below, for instance, or a hydroxyl-containing carboxylate anion represented by the general formula 35, for instance, for the substitution of a hydroxyl-containing group for the halogen.

$$HO—R^{35}—O^-M^+ \quad (34)$$

(In the formula, $R^{35}$ and $M^+$ are as defined above.)

$$HO—R^{35}—C(O)O^-M^+ \quad (35)$$

(In the formula, $R^{35}$ and $M^+$ are as defined above.)

In the practice of the invention, when no halogen is directly involved in hydroxyl group introduction as in the methods (a) and (b), the method (b) is more preferred from the viewpoint of easier controllability.

In cases where hydroxyl group introduction is effected by conversion of the halogen of a vinyl polymer having at least one carbon-halogen bond, as in the methods (c) to (f), the method (f) is more preferred from the viewpoint of easier controllability.

The above method (3) is now described.

(3) The method comprising reacting a hydroxyl-containing vinyl polymer with a diisocyanate compound and then reacting the residual isocyanate group with a compound represented by the general formula 36:

$$HO-R^{31}-OC(O)C(R^{13})=CH_2 \quad (36)$$

(wherein $R^{13}$ represents a hydrogen atom or an organic group containing 1 to 20 carbon atoms and $R^{31}$ represents a divalent organic group containing 2 to 20 carbon atoms).

The compound represented by the general formula 36 is not particularly restricted but, as specific examples of $R^{13}$, there may be mentioned —H, —$CH_3$, —$CH_2CH_3$, —$(CH_2)_n$$CH_3$ (n being an integer of 2 to 19), —$C_6H_5$, —$CH_2OH$, —CN and the like. Among them, H and —$CH_3$ are preferred. As a typical compound, there may be mentioned 2-hydroxypropyl methacrylate.

The terminal hydroxyl-containing vinyl polymer is as mentioned hereinabove.

The diisocyanate compound is not particularly restricted but may be any of those known in the art, for example toluylene diisocyanate, 4,4'-diphenylmethanediisocyanate, hexamethyl diisocyanate, xylylene diisocyanate, metaxylylene diisocyanate, 1,5-naphthalenediisocyanate, hydrogenated diphenylmethanediisocyanate, hydrogenated toluylene diisocyanate, hydrogenated xylylene diisocyanate, isophoronediisocyanate, and like isocyanate compounds. These may be used singly or two or more of them may be used in combination. These may also be used in the form of blocked isocyanates.

For making better use of the excellent weatherability, the use of aromatic ring-free diisocyanate compounds such as hexamethylene diisocyanate and hydrogenated diphenylmethanediisocyanate is preferred.

Re: (B) Component, Namely Heavy or Ground Calcium Carbonate (II)

The heavy or ground calcium carbonate (II) to be used in accordance with the present invention is a product derived from naturally-occurring chalk, marble, limestone or the like by mechanical grinding and treatment. While the method of grinding includes the dry process and wet process, products obtained by wet grinding often deteriorate the storage stability of the curable composition of the invention, hence are not preferred. While heavy or ground calcium carbonate, when classified, gives products widely varying in average particle size, the heavy or ground calcium carbonate (II) to be used in the practice of the invention has a specific surface area of not smaller than 1.5 m²/g but not larger than 50 m²/g. The value of the specific surface area of the heavy or ground calcium carbonate (II) to be used in accordance with the invention is the measured value obtained by the air permeation method according to JIS K 5101 (measurement method according to which the specific surface area is calculated based on the air permeability of a powder-packed layer). A Shimadzu model SS-100 specific surface area measuring apparatus is preferably used as the measurement apparatus.

The value of the specific surface area of the heavy or ground calcium carbonate (II) to be used in the practice of the invention is not smaller than 1.5 m²/g but not larger than 50 m²/g, preferably not smaller than 2 m²/g but not larger than 50 m²/g, more preferably not smaller than 2.4 m²/g but not larger than 50 m²/g, most preferably not smaller than 3 m²/g but not larger than 50 m²/g. When the specific surface area is smaller than 1.5 m²/g, the improving effects on the breaking strength, breaking elongation, adhesiveness and weather-resistant adhesiveness of the cured products may be unsatisfactory in some cases. With the increase in specific surface area value, the improving effects on the breaking strength, breaking elongation, adhesiveness and weather-resistant adhesiveness of the cured products become more significant. It is preferred, however, that the specific surface area be not larger than 50 m²/g.

Surface Treatment

The heavy or ground calcium carbonate (II) to be used in the practice of the invention is more preferably a heavy or ground calcium carbonate species surface-treated with a surface treatment agent. When surface-treated calcium carbonate is used as the (B) component, it is expected that the workability of the composition of the invention be improved and the improving effects on the adhesiveness and weather-resistant adhesiveness of the curable composition be further enhanced. In use as the surface treatment agent are fatty acids, fatty acid soaps, fatty acid esters and like organic substances and various surfactants as well as various coupling agents such as silane coupling agents and titanate coupling agents. Specific examples thereof include, but are not limited to, fatty acids such as caproic acid, caprylic acid, pelargonic acid, capric acid, undecanoic acid, lauric acid, myristic acid, palmitic acid, stearic acid, behenic acid and oleic acid, sodium, potassium and other salts of such fatty acids, and alkyl esters of such fatty acids. As specific examples of the surfactants, there may be mentioned sulfate type anionic surfactants such as polyoxyethylene alkyl ether sulfates and long-chain alcohol sulfates, and sodium, potassium and other salts thereof, sulfonic acid type anionic surfactants such as alkylbenzenesulfonic acids, alkylnaphthalenesulfonic acids, paraffinsulfonic acids, α-olefinsulfonic acids, alkylsulfosuccinic acids and the like, and sodium, potassium and other salts thereof.

The above surface treatment agent is used in the treatment preferably in an amount within the range of 0.1 to 20% by weight, more preferably within the range of 1 to 5% by weight. When the amount for the treatment is smaller than 0.1% by weight, the improving effects on the workability, adhesiveness and weather-resistant adhesiveness may be insufficient in certain instances and, when it exceeds 20% by weight, the storage stability of the curable composition may lower in some cases.

Addition Level

In the practice of the invention, the heavy or ground calcium carbonate (II) is used preferably in an amount of 5 to 500 parts by weight, more preferably 20 to 350 parts by weight, most preferably 40 to 200 parts by weight, per 100 parts by weight of the vinyl polymer (I). When the amount incorporated is smaller than 5 parts by weight, the improving effects on the breaking strength, breaking elongation, adhesiveness and weather-resistant adhesiveness of the cured product may be insufficient in certain instances and, when it exceeds 500 parts by weight, the workability of the curable composition may lower in some cases. In the practice of the invention, the heavy or ground calcium carbonate (II) may comprise one single species or a combination of two or more species.

A heavy or ground calcium carbonate species having a specific surface area smaller than 1.5 m²/g may be used in combination in an amount such that the breaking strength, breaking elongation, adhesiveness and weather-resistant adhesiveness of the cured product will not be deteriorated. The composition of the invention may further modified by incorporation of various fillers as fillers other than the heavy or ground calcium carbonate (II). Specific examples of such fillers include, but are not limited to, wood flour, pulp, cotton chips, asbestos, glass fiber, carbon fiber, mica, walnut shell flour, chaff flour, graphite, diatomaceous earth, kaolin, fumed silica, precipitated silica, crystalline silica, fused silica, dolomite, silicic anhydride, hydrous silicic acid, carbon black, and like reinforcing fillers; colloidal calcium carbonate, magnesium carbonate, diatomaceous earth, calcined clay, clay, talc, titanium oxide, bentonite, organic bentonite, ferric oxide, aluminum microparticle, flint powder, zinc oxide, activated hydrozincite, zinc powder, shirasu balloons, and like fillers; asbestos, glass fiber, glass filaments, and like fibrous fillers. These fillers may be used in combination with the heavy or ground calcium carbonate (II) either singly or in combination of two or more of them.

Curable Composition

In the curable composition of the present invention, a curing catalyst and/or a curing agent may or may not be needed depending on crosslinking functional groups. Any of various additives may be added thereto according to the required physical properties.

Curing Catalyst, Curing Agent

In the Case of Crosslinking Silyl Groups

The crosslinking silyl group-containing polymer is crosslinked and cured under siloxane bond formation in the presence or absence of various condensing catalysts known in the art. The properties of the cured products can widely range from rubber-like to resinous ones according to the molecular weight and main chain skeleton of the polymer.

As examples of such condensing catalyst, there may be mentioned, among others, tetravalent tin compounds such as dibutyltin dilaurate, dibutyltin diacetate, dibutyltin diethylhexanolate, dibutyltin dioctoate, dibutyltin di(methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate) and dioctyltin di(isooctyl maleate); divalent tin compounds such as stannous octylate, stannous naphthenate and stannous stearate; titanate esters such as tetrabutyl titanate and tetrapropyl titanate; organoaluminum compounds such as aluminum trisacetylacetonate, aluminum tris(ethyl acetoacetate) and diisopropoxyalminium ethyl acetoacetate; chelate compounds such as zirconium tetraacetylacetonate and titanium tetraacetylacetoante; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; amine compound-organotin compound reaction products and mixtures, for example laurylamine-stannous octylate reaction products or mixtures; low-molecular-weight polyamide resins obtained from a polyamine in excess and a polybasic acid; reaction products from a polyamine in excess and an epoxy compound; amino group-containing silane coupling agents such as γ-aminopropyltrimethoxysilane and N-(β-aminoethyl)aminopropylmethyldimethoxysilane; and like silanol condensation catalysts and, further, other known silanol condensation catalysts such as acidic catalysts and basic catalysts.

These catalysts may be used singly or two or more of them may be used in combination. The level of addition of such condensation catalyst is preferably about 0.1 to 20 parts (by weight; hereinafter same shall apply), more preferably 1 to 10 parts, per 100 parts of the vinyl polymer (I) having at least one crosslinking silyl group. When the addition level of the silanol condensing catalyst is below the above range, the rate of curing may fall and the curing can hardly proceed to a satisfactory extent in some cases. Conversely, when the level of addition of the silanol condensation catalyst exceeds the above range, local heat generation and/or foaming may occur in the step of curing, making it difficult to obtain good cured products; in addition, the pot life becomes excessively short and this is unfavorable from the workability viewpoint.

For further increasing the activity of the condensation catalyst in the curable composition of the present invention, a silanol group-free silicon compound represented by the general formula 37:

$(R^{49})_a Si(OR^{50})_{4-a}$ (37)

(wherein $R^{49}$ and $R^{50}$ each independently is a substituted or unsubstituted hydrocarbon group containing 1 to 20 carbon atoms and a is 0, 1, 2 or 3) may be added to the composition.

The above silicon compound is not restricted but those compounds of the general formula 37 in which $R^{49}$ is an aryl group containing 6 to 20 carbon atoms, such as phenyltrimethoxysilane, phenylmethyldimethoxysilane, phenyldimethylmethoxysilane, diphenyldimethoxysilane, diphenyldiethoxysilane and triphenylmethoxysilane, are preferred since their accelerating effect on the curing reaction of the composition is significant. In particular, diphenyldimethoxysilane and diphenyldiethoxysilane are low in cost and readily available, hence are most preferred.

The level of addition of this silicon compound is preferably about 0.01 to 20 parts, more preferably 0.1 to 10 parts, per 100 parts of the vinyl polymer (I) having at least one crosslinking silyl group. When the level of addition of the silicon compound is below this range, the curing reaction-accelerating effect may decrease in certain cases. When, conversely, the level of addition of the silicon compound exceeds this range, the hardness and/or tensile strength of the cured products may fall.

In the Case of Alkenyl Groups

When alkenyl groups are involved in the crosslinking, it is preferred, though not obligatory, that the crosslinking be effected in the manner of hydrosilylation using a hydrosilyl group-containing compound as a curing agent, together with a hydrosilylation catalyst.

The hydrosilyl group-containing compound is not particularly restricted, but may be any of those hydrosilyl group-containing compounds which can cure with the alkenyl-containing polymer by crosslinking. For example, use may be made of linear polysiloxanes represented by the general formula 38 or 39:

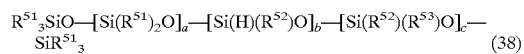

$R^{51}{}_3SiO\text{—}[Si(R^{51})_2O]_a\text{—}[Si(H)(R^{52})O]_b\text{—}[Si(R^{52})(R^{53})O]_c\text{—}SiR^{51}{}_3$ (38)

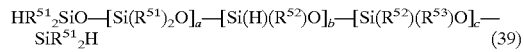

$HR^{51}{}_2SiO\text{—}[Si(R^{51})_2O]_a\text{—}[Si(H)(R^{52})O]_b\text{—}[Si(R^{52})(R^{53})O]_c\text{—}SiR^{51}{}_2H$ (39)

(wherein $R^{51}$ and $R^{52}$ each represents an alkyl group containing 1 to 6 carbon atoms or a phenyl group, $R^{53}$ represents an alkyl group or aralkyl group containing 1 to 10 carbon atoms, and a, b and c each represents an integer satisfying the relation $0 \leq a \leq 100$, $2 \leq b \leq 100$ or $0 \leq c \leq 100$);

cyclic siloxanes represented by the general formula 40:

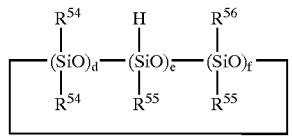
(40)

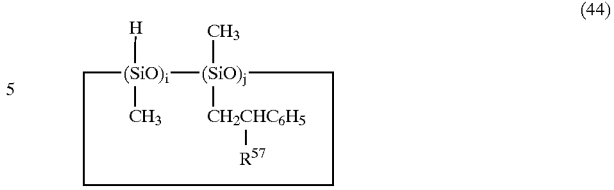
(44)

(wherein $R^{54}$ and $R^{55}$ each represents an alkyl group containing 1 to 6 carbon atoms or a phenyl group, $R^{56}$ represents an alkyl group or aralkyl group containing 1 to 10 carbon atoms, and d, e and f each represents an integer satisfying the relations $0 \leq d \leq 8$, $2 \leq e \leq 10$ or $0 \leq f \leq 8$ provided that the relation $3 \leq d+e+f \leq 10$ should be satisfied); and so forth.

These may be used singly or two or more of them may be used in admixture. Among these siloxanes, phenyl-containing linear siloxanes represented by the general formula 41 or 42 shown below and cyclic siloxanes represented by the general formula 43 or 44 are preferred from the viewpoint of compatibility with the (meth)acrylic polymer.

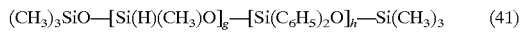
(41)

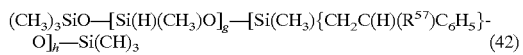
(42)

(In the above formulas, $R^{57}$ represents a hydrogen atom or a methyl group, g and h each represents an integer satisfying the relation $2 \leq g \leq 100$ or $0 \leq h \leq 100$, and $C_6H_5$ represents a phenyl group.)

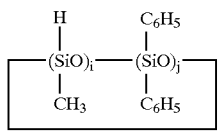
(43)

(In the above formulas, $R^{57}$ represents a hydrogen atom or a methyl group, i and j each represents an integer satisfying the relation $2 \leq i \leq 10$ or $0 \leq j \leq 8$, with the provided that $3 \leq i+j \leq 10$, and $C_6H_5$ represents a phenyl group.)

Further usable as the hydrosilyl-containing compound are compounds obtained by subjecting a low-molecular-weight compound having two or more alkenyl groups in each molecule and a hydrosilyl-containing compound represented by any of the general formula 38 to 44 to addition reaction in a manner such that the hydrosilyl group partially remains even after reaction. Usable as the compound having two or more alkenyl groups in the molecule are various compounds, for example hydrocarbon compounds such as 1,4-pentadiene, 1,5-hexadiene, 1,6-heptadiene, 1,7-octadiene, 1,8-nonadiene and 1,9-decadiene, ether compounds such as O,O'-diallylbisphenol A and 3,3'-diallylbisphenol A, ester compounds such as diallyl phthalate, diallyl isophthalate, triallyl trimellitate and tetraallyl pyromellitate, and carbonate compounds such as diethylene glycol diallyl carbonate.

The above compounds can be obtained by slowly adding dropwise the alkenyl-containing compound to an excess of the hydrosilyl-containing compound represented by one of the general formulas 38 to 44 shown above in the presence of a hydrosilylation catalyst. Among such compounds, the following ones are preferred in view of the ready availability of raw materials, the ease of removal of the siloxane used in excess and, further, the compatibility with the (A) component polymer:

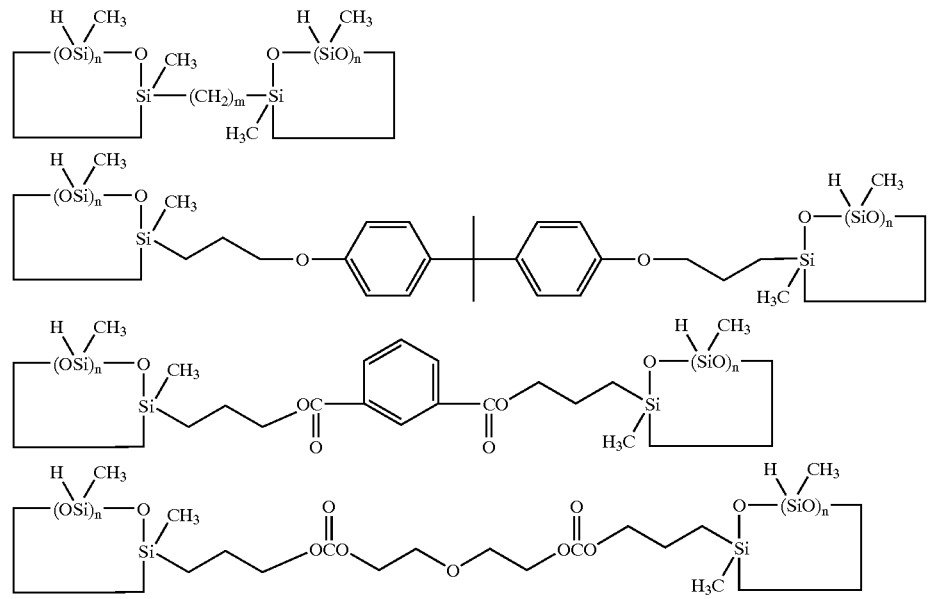

(n being an integer of 2 to 4 and m being an integer of 5 to 10).

The polymer and curing agent may be mixed together in an arbitrary ratio but, from the curability viewpoint, the mole ratio between the alkenyl and hydrosilyl groups is preferably within the range of 5 to 0.2, more preferably within the range of 2.5 to 0.4. When the mole ratio is above 5, the curing becomes insufficient and only cured products having surface tack and low strength can be obtained. When it is lower than 0.2, the active hydrosilyl group remains in large amounts in the cured product even after curing, so that cracks and voids appear and no uniform and strong cured products can be obtained.

The curing reaction between the polymer and curing agent proceeds when the two components are mixed up and heated. For promoting the reaction more rapidly, a hydrosilylation catalyst may be added. Such hydrosilylation catalyst is not particularly restricted but may be, for example, a radical initiator such as an organic peroxide or azo compound, or a transition metal catalyst.

The radical initiator is not particularly restricted but includes, among others, dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butyl cumyl peroxide and α, α-bis(t-butylperoxy) isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peroxy esters such as t-butyl perbenzoate, peroxydicarbonates such as diisopropyl peroxydicarbonate and di-2-ethylhexyl peroxydicarbonate, peroxy ketals such as 1,1-di(t-butylperoxy)cyclohexane and 1,1-di(t-butylperoxy)-3,3,5-trimethylcyclohexane, and the like.

The transition metal catalyst is not particularly restricted, either, but includes, among others, simple substance platinum, solid platinum dispersed on a support such as alumina, silica or carbon black, chloroplatinic acid, chloroplatinic acid complexes with alcohols, aldehydes, ketones or the like, platinum-olefin complexes, and platinum(0)-divinyltetramethyldisiloxane complex. As other catalysts than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$, for instance. These catalysts may be used singly or two or more of them may be used in combination. The amount of the catalyst is not particularly restricted but recommendably is within the range of $10^{-1}$ to $10^{-8}$ mole, preferably $10^{-3}$ to $10^{-6}$ mole, per mole of the alkenyl group of the vinyl polymer (I). When it is less than $10^{-8}$ mole, the curing will not proceed to a sufficient extent. Since the hydrosilylation catalyst is expensive, it is preferred that it be not used in an amount exceeding $10^{-1}$ mole.

The curing temperature is not particularly restricted but, recommendably, the curing is carried generally out at 0° C. to 200° C., preferably at 30° C. to 150° C., more preferably at 80° C. to 150° C.

In the Case of Hydroxyl Group

The hydroxyl-containing polymer according to the invention can be cured uniformly by using, as a curing agent, a compound having two or more functional groups capable of reacting with the hydroxyl group. As specific examples of the curing agent, there may be mentioned, among others, polyvalent isocyanate compounds having two or more isocyanato groups in each molecule, aminoplast resins such as methylolated melamine and alkyl-etherification derivatives thereof or low condensation products thereof, and polyfunctional carboxylic acids and halides thereof. When cured products are to be produced by using these curing agents, appropriate curing catalysts can be used for the respective curing agents.

In the Case of Amino Groups

The amino group-containing polymer according to the invention can be cured uniformly by using, as a curing agent, a compound having two or more functional groups capable of reacting with the amino group. As specific examples of the curing agent, there may be mentioned, among others, polyvalent isocyanate compounds having two or more isocyanato groups in each molecule, aminoplast resins such as methylolated melamine and alkyl-etherification derivatives thereof or low condensation products thereof, and polyfunctional carboxylic acids and halides thereof. When cured products are to be produced by using these curing agents, appropriate curing catalysts can be used for the respective curing agents.

In the Case of Epoxy Group

The curing agent to be used for the epoxy-containing polymer according to the invention is not particularly restricted. Usable as such are, for example, aliphatic amines, alicyclic amines, aromatic amines; acid anhydrides; polyamides; imidazoles; amineimides; urea; melamine and derivatives thereof; polyamine salts; phenol resins: polymer-captans; polysulfides; and photocuring/ultraviolet curing agents such as aromatic diazonium salts, diallyliodonium salts, triallylsulfonium salts and triallylselenium salts.

In the Case of Polymerizable Carbon-carbon Double Bonds

The polymerizable carbon-carbon double bond-containing polymer can be crosslinked through the polymerization reaction of its polymerizable carbon-carbon double bond.

The method of crosslinking includes curing with activated energy rays, and thermal curing. In the activated energy ray-curable composition, the photopolymerization initiator is preferably a photoradical initiator or a photoanion initiator. For the thermal curable composition, the thermal polymerization initiator is preferably selected from the group consisting of azo initiators, peroxides, persulfates, and redox initiator systems.

In the following, these crosslinking reactions are described in detail.

When the polymerizable carbon-carbon double bond-containing polymer is to be crosslinked, a polymerizable monomer and/or oligomer and/or various additives may be combinedly used according to the intended purpose. Preferred as the polymerizable monomer and/or oligomer are monomers and/or oligomers having a radical-polymerizable group or an anionically polymerizable group. The radical-polymerizable group includes acrylic functional groups such as the (meth) acrylic group, styrene group, acrylonitrile group, vinyl ester group, N-vinylpyrrolidone group, acrylamide group, conjugated diene group, vinyl ketone group, vinyl chloride group, etc. Among them, those having a (meth)acrylic group similar to the polymer of the invention are preferred. The anionically polymerizable group includes the (meth)acrylic group, styrene group, acrylonitrile group, N-vinylpyrrolidone group, acrylamide group, conjugated diene group, vinyl ketone group, etc. Among them, those having an acrylic functional group are preferred.

As specific examples of the above monomer, there may be mentioned (meth)acrylate monomers, cyclic acrylates, N-vinylpyrrolidone, styrenic monomers, acrylonitrile, N-vinylpyrrolidone, acrylamide monomers, conjugated diene monomers, vinyl ketone monomers, etc. As the (meth) acrylate monomers, there may be mentioned n-butyl (meth) acrylate, 2-ethylhexyl (meth)acrylate, isooctyl (meth)

acrylate, isononyl (meth)acrylate, and compounds of the following formulas:

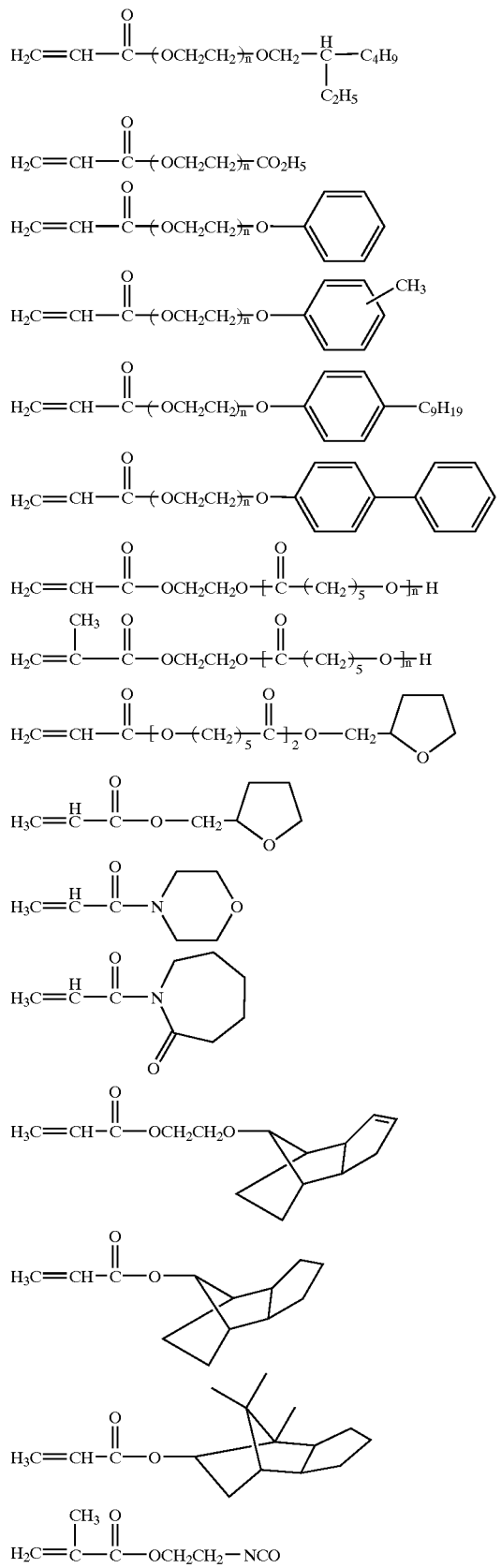

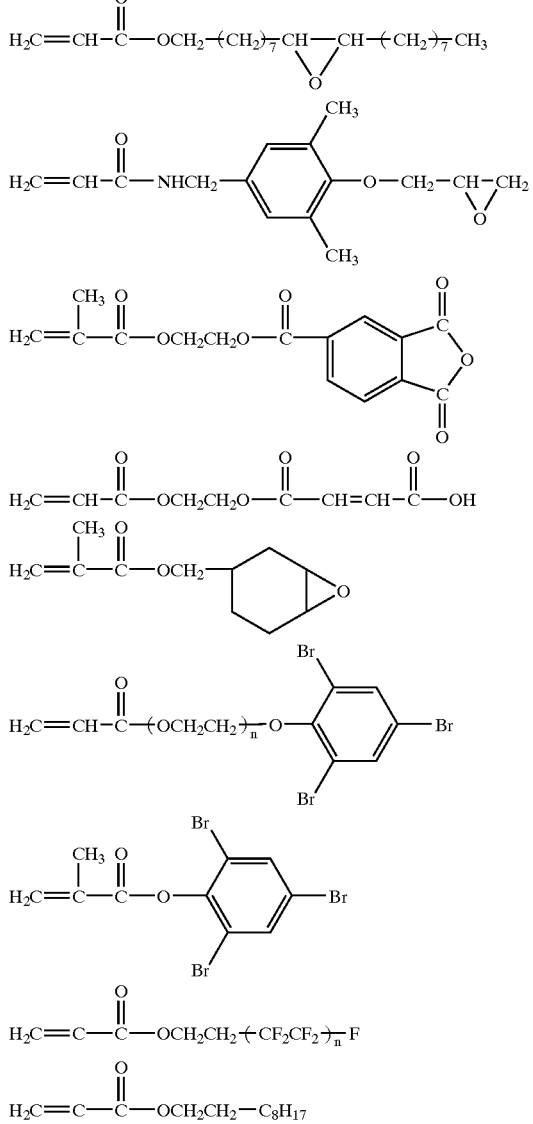

(In the above formulas, n represents an integer of 0 to 20.)

The styrenic monomers include styrene, α-methylstyrene, etc., the acrylamide monomers include acrylamide, N,N-dimethylacrylamide, etc., the conjugated diene monomers include butadiene, isoprene, etc., and the vinyl ketone monomers include methyl vinyl ketone and the like.

As polyfunctional monomers, there may be mentioned neopentyl glycol polypropoxy diacrylate, trimethylolpropane polyethoxy triacrylate, bisphenol F polyethoxy diacrylate, bisphenol A polyethoxy diacrylate, dipentaerythritol polyhexanolide hexaacrylate, tris (hydroxyethyl) isocyanurate polyhexanolide triacrylate, tricyclodecanedimethylol diacrylate, 2-(2-acryloyloxy-1,1-dimethyl)-5-ethyl-5-acryloyloxymethyl-1,3-dioxane, tetrabromobisphenol A diethoxy diacrylate, 4,4'-dimercaptodiphenyl sulfide dimethacrylate, polytetraethylene glycol diacrylate, 1,9-nonanediol diacrylate, ditrimethylolpropane tetraacrylate, etc.

As the oligomers, there may be mentioned bisphenol A-based epoxy acrylate resins, phenol novolak-based epoxy acrylate resins, cresol novolak-based epoxy acrylate resins and like epoxy acrylate resins, COOH-modified epoxy acrylate resins, urethane acrylate resins obtained by reacting urethane resins prepared from a polyol (e.g. polytetramethylene glycol, polyester diol derived from ethylene glycol and adipic acid, ε-caprolactone-modified polyester diol, polypropylene glycol, polyethylene glycol, polycarbonate diol, hydroxyl-terminated hydrogenated polyisoprene, hydroxyl-terminated polybutadiene, hydroxyl-terminated polyisobutylene) and an organic isocyanate (e.g. tolylene diisocyanate, isophoronediisocyanate, diphenylmethanediisocyanate, hexamethylene diisocyanate, xylylene diisocyanate) with a hydroxyl-containing (meth)acrylate {e.g. hydroxyethyl (meth)acrylate, hydroxypropyl (meth)acrylate, hydroxybutyl (meth)acrylate, pentaerythritol triacrylate}, resins derived from the above-mentioned polyol by introduction of (meth)acrylic group via ester bonding, polyester acrylate resins, and so forth.

An appropriate one is selected from among these monomers and oligomers according to the initiator and curing conditions employed.

It is preferred for good compatibility reasons that the acrylic functional group-containing monomer and/or oligomer preferably have a number average molecular weight of not higher than 2,000, more preferably not higher than 1,000.

As for the method of crosslinking the polymerizable carbon-carbon double bond-containing polymer, the use of UV or electron beams or like activated energy rays is preferred.

When crosslinking is effected by means of activated energy rays, it is preferred that the composition contain a photopolymerization initiator.

The photopolymerization initiator to be used in the practice of the invention is not particularly restricted but preferably is a photoradical initiator or photoanion initiator, in particular a photoradical initiator. As examples, there may be mentioned acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoil, benzoin methyl ether, benzoin butyl ether, bis(4-dimethylaminophenyl) ketone, benzyl methoxy ketal, 2-chlorothioxanthone, and the like. These initiators may be used singly or in combination with another compound. More specifically, mention may be made of combinations with amines such as diethanolmethylamine, dimethylethanolamine and triethanolamine, further combined with an iodonium salt such as diphenyliodonium chloride, and combinations with a dye, such as Methylene Blue, and an amine.

Further, a near-infrared-absorbing cationic dye may also be used as a near-infrared photopolymerization initiator. The near-infrared-absorbing cationic dye to be used is preferably a near-infrared-absorbing cationic dye-borate anion complex capable of being excited by ray energy in the region of 650 to 1,500 nm, such as one disclosed in Japanese Kokai Publication Hei-03-111402 or Japanese Kokai Publication Hei-05-194619, for instance. The combined use of a boron-containing sensitizer is more preferred.

The level of addition of the photopolymerization initiator is such that the system can be photofunctionalized only slightly; hence it is not particularly restricted. Preferably, however, the level is 0.001 to 10 parts by weight per 100 parts of the polymer in the composition.

The method of curing the activated energy ray-curable composition of the present invention is not particularly restricted but may involve irradiation with rays or electron beams using a high-pressure mercury lamp, low-pressure mercury lamp, electron beam irradiation equipment, halogen lamp, light emitting diode, semiconductor laser, etc.

As for the method of crosslinking the polymerizable carbon-carbon double bond-containing polymer, the thermal method is preferred.

In effecting the crosslinking by means of activated energy rays, it is preferred that the composition contain a thermal polymerization initiator.

The thermal polymerization initiator to be used in the practice of the present invention is not particularly restricted but includes azo initiators, peroxides, persulfate salts, and redox initiator systems.

Suitable azo initiators include, but are not limited to, 2,2'-azobis(4-methoxy-2,4-dimethylvaleronitrile) (VAZO 33), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67), 1,1-azobis(1-cyclohexanecarbonitrile) (VAZO 88) (all available from DuPont Chemical), 2,2'-azobis(2-cyclopropylpropionitrile), and 2,2'-azobis (methyl isobutyrate) (V-601) (available from Wako Pure Chemical Industries), among others.

Appropriate peroxide initiators include, but are not limited to, benzoyl peroxide, acetyl peroxide, lauroyl peroxide, decanoyl peroxide, dicetyl peroxydicarbonate, di(4-t-butylcyclohexyl) peroxydicarbonate (Perkadox 16S) (available from Akzo Nobel), di(2-ethylhexyl) peroxydicarbonate, t-butyl peroxypivalate (Lupersol 11) (available from Elf Atochem), t-butyl peroxy-2-ethylhexanoate (Trigonox 21-C50) (available from Akzo Nobel) and dicumyl peroxide, among others.

Appropriate persulfate initiator systems include, but are not limited to, potassium persulfate, sodium persulfate and ammonium persulfate, among others.

Suitable redox (oxidation/reduction) initiators include, but are not limited to, combinations of the above-mentioned persulfate initiators and a reducing agent such as sodium hydrogen metasulfite or sodium hydrogen sulfite; systems based on an organic peroxide and a tertiary amine, such as the system based on benzoyl peroxide and dimethylaniline; and systems based on organic hydroperoxide and a transition metal, such as the system based on cumene hydroperoxide and cobalt naphthenate.

Other initiators include, but are not limited to, pinacols, such as tetraphenyl-1,1,2,2-ethanediol.

Preferred thermal radical initiators are selected from the group comprising azo initiators and peroxide initiators. More preferred ones are 2,2'-azobis(methyl isobutyrate), t-butyl peroxypivalate and di(4-t-butylcyclohexyl) peroxydicarbonate, and mixtures of these.

When used in the present invention, the thermal initiator is present in a catalytically effective amount, and such amount is not restricted but, typically, is about 0.01 to 5 parts by weight, preferably about 0.025 to 2 parts by weight, per 100 parts by weight of the total amount of the polymer according to the invention, which has at least one terminal acrylic functional group, and the additional monomer and oligomer mixture. When a mixture of initiators is used, the total amount of the initiator mixture is selected as if only one initiator were used.

The method of curing the thermal-curable composition of the invention is not particularly restricted. The temperature depends on the thermal initiator used, the polymer (I), the compound added and so forth. Generally, it is preferably within the range of 50° C. to 250° C., more preferably within the range of 70° C. to 200° C. The curing time depends, among others, on the polymerization initiator, monomer, solvent and reaction temperature employed but, generally, it is within the range of 1 minute to 10 hours.

Adhesiveness Providing Agent

In the composition of the invention, there may be incorporated a silane coupling agent and/or an adhesiveness providing agent other than the silane coupling agent. As specific examples of the silane coupling agent, there may be mentioned isocyanato group-containing silanes such as γ-isocyanatopropyltrimethoxysilane, γ-isocyanatopropyltriethoxysilane, γ-isocyanatopropylmethyldiethoxysilane and γ-isocyanatopropylmethyldimethoxysilane; amino group-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane and β-(3,4-epoxycyclohexyl)ethyltriethoxysilane; carboxysilanes such as β-carboxyethyltriethoxysilane, β-carboxyethylphenylbis(2-methoxyethoxy)silane and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane and γ-acryloyloxypropylmethyltriethoxysilane;

halogen-containing silanes such as

γ-chloropropyltrimethoxysilane; and isocyanurate silanes such as tris(trimethoxysilyl) isocyanurate. Also usable as the silane coupling agent are modification derivatives of these, for example amino-modified silyl polymers, silylated amino polymers, unsaturated amino silane complexes, phenylamino-long chain alkylsilanes, aminosilylated silicones and silylated polyesters.

In the practice of the invention, the silane coupling agent is used generally in an amount within the range of 0.1 to 20 parts per 100 parts of the crosslinking functional group-containing polymer. In particular, the use thereof within the range of 0.5 to 10 parts is preferred. As for the effect of the silane coupling agent added to the curable composition of the invention, it produces marked adhesive property improving effects under non-primer or primer-treated conditions when the composition is applied to various adherend materials, namely inorganic materials such as glass, aluminum, stainless steel, zinc, copper and mortar, or organic materials such as polyvinyl chloride, acrylics, polyesters, polyethylene, polypropylene and polycarbonates. When it is used under non-primer conditions, the improving effects on the adhesiveness to various adherends are particularly remarkable. Specific examples of the agent other than the silane coupling agent include, but are not particularly limited to, epoxy resins, phenol resins, sulfur, alkyl titanates and aromatic polyisocyanates, among others.

The adhesive property providing agents specifically mentioned above may be used singly or two or more of them may be used in admixture. By adding these adhesive property-providing agents, it is possible to improve the adhesiveness to adherends.

Plasticizer

If necessary, any of various plasticizers may be used in the curable composition of the present invention. Such plasticizer is not particularly restricted but, according to the purpose of addition, for example adjustment of physical properties and/or adjustment of other properties, use can be made of one or a mixture of two or more of phthalate esters such as dibutyl phthalate, diheptyl phthalate, di(2-ethylhexyl) phthalate and butyl benzyl phthalate; nonaromatic dibasic acid esters such as dioctyl adipate, dioctyl sebacate, dibutyl sebacate and isodecyl succinate; fatty acid esters such as butyl oleate and methyl acetylricinolate; polyalkylene glycol esters such as diethylene glycol dibenzoate, triethylene glycol dibenzoate and pentaerythritol esters; phosphates such as tricresyl phosphate and tributyl phosphate; trimellitates; polystyrenes such as polystyrene and poly-α-methylstyrene; polybutadiene, polybutene, polyisobutylene, butadiene-acrylonitrile, polychloroprene; chlorinated paraffins; hydrocarbon oils such as alkyldiphenyls and partially hydrogenated terphenyl; process oils; polyethers such as polyethylene glycol, polypropylene glycol, polytetramethylene glycol and like polyether polyols and derivatives of these polyether polyols as resulting from conversion of hydroxyl groups thereof to ester, ether and/or like groups; epoxy plasticizers such as epoxidized soybean oil and epoxidized benzyl stearate; polyester plasticizers obtained from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; and vinyl polymers obtained by polymerizing vinyl monomers by various methods, typically acrylic plasticizers, among others, although these are not always necessary. It is also possible to incorporate these plasticizers in the process of polymer production.

The level of addition of the plasticizer, when this is used, is not particularly restricted but generally is 5 to 150 parts by weight, preferably 10 to 120 parts by weight, more preferably 20 to 100 parts by weight, per 100 parts by weight of the vinyl polymer (I). At levels below 5 parts by weight, the effects as the plasticizer are no more expressed and, at levels above 150 parts by weight, the mechanical strength of the cured products becomes insufficient.

Physical Property-adjusting Agent

One or more physical property-adjusting agents may be added to the curable composition of the present invention according to need for adjusting the tensile characteristics of the resulting cured products.

The physical property adjusting agent is not particularly restricted but includes, among others, alkylalkoxysilanes such as methyltrimethoxysilane, dimethyldimethoxysilane, trimethylmethoxysilane and n-propyltrimethoxysilane; functional group-containing alkoxysilanes, for example alkylisopropenoxysilanes such as
dimethyldiisopropenoxysilane, methyltriisopropenoxysilane and γ-glycidoxypropylmethyldiisopropenoxysilane,
γ-glycidoxypropylmethyldimethoxysilane,
γ-glycidoxypropyltrimethoxysilane, vinyltrimethoxysilane,
vinyldimethylmethoxysilane, γ-aminopropyltrimethoxysilane,
N-(β-aminoethyl)aminopropylmethyldimethoxysilane,
γ-mercaptopropyltrimethoxysilane and
γ-mercaptopropylmethyldimethoxysilane; silicone varnishes;
and polysiloxanes. By using such physical property-adjusting agent, it becomes possible to increase or decrease the hardness and/or attain elongation properties as obtainable upon curing of the composition of the invention. The physical property modifies such as mentioned above may be used singly or two or more of them may be used in combination.

Thixotropy Providing Agent (Antisagging Agent)

A thixotropy providing agent (antisagging agent) may be added to the curable composition of the invention according to need for sagging prevention and workability improvement.

The antisagging agent is not particularly restricted but includes, among others, polyamide waxes, hydrogenated castor oil derivatives; and metal soaps such as calcium stearate, aluminum stearate and barium stearate. These thixotropy providing agents (antisagging agents) may be used singly or two or more of them may be used in combination.

Other Additives

Where necessary, one or more of various additives may be added to the curable composition of the invention for the purpose of adjusting various physical properties of the curable composition and/or cured products. As examples of such additives, there may be mentioned, among others, flame retardants, curability adjusting agents, antioxidants, radical inhibitors, ultraviolet absorbers, metal deactivators, antiozonants, light stabilizers, phosphorus-containing peroxide decomposers, lubricants, pigments, foaming agents, and photocurable resins. These various additives may be used singly or two or more species may be used in combination.

Specific examples of these additives are described, for example, in Japanese Kokoku Publication Hei-04-69659, Japanese Kokoku Publication Hei-07-108928, Japanese Kokai Publication Sho-63-254149 and Japanese Kokai Publication Sho-64-22904.

The curable composition of the present invention can be prepared as a one-pack formulation by compounding all the components in advance and storing the compound in a tightly closed container, which formulation, when applied, undergoes curing by atmospheric moisture, or as a two-pack formulation by separately compounding a curing catalyst, filler, plasticizer, water and other components in advance to give a curing agent composition. In the latter case, the compound is admixed with the polymer composition prior to use.

Uses

The curing composition of the present invention can be used in various fields of application which include, but are not limited to, sealants, for example elastic sealants for building and construction and sealants for multilayer glass, materials for electric and electronic parts such as solar battery backside sealants, electric insulating materials such as insulating sheath for wire and cable, pressure sensitive adhesives, adhesives, elastic adhesives, paints, powder coatings, coating materials, foamed articles, potting agents for electric and electronic use, films, gaskets, casting materials, various molding materials, and rustproof and waterproof sealants for end faces (cut edges) of net glass or laminated glass.

EXAMPLES

In the following, specific examples according to the present invention and comparative examples are given to illustrate the invention. The following examples are, however, by no means limitative of the scope of the present invention.

In the following examples and comparative examples, "part(s)" and "%" mean "part(s) by weight" and "% by weight", respectively.

In the following examples, the "number average molecular weight" and "molecular weight distribution (ratio of weight average molecular weight to number average molecular weight)" were calculated by the standard polystyrene equivalent method using gel permeation chromatography (GPC). The GPC column used was one packed with polystyrene-crosslinked gel (Shodex GPC K-804; product of Showa Denko) and the GPC solvent used was chloroform.

Production Example 1
Synthesis of an alkenyl Group-containing Carboxylic Acid Salt 10-Undecenic acid (150 g, 0.814 mol) and potassium tert-butoxide (91.3 g, 0.814 mol) were added to methanol (250 mL), and the mixture was stirred at 0° C. The volatile matter was distilled off by heating under reduced pressure to give potassium undecenoate represented by the following formula:

$$CH_2=CH-(CH_2)_8-CO_2^-{}^+K$$

Semi-batchwise Polymerization of BA-5 kg

A 10-liter glass reaction vessel was charged with cuprous bromide (35.3 g, 0.246 mol) and acetonitrile (470 mL), and the contents were heated at 70° C. for 60 minutes. Thereto were added butyl acrylate (940 mL, 6.56 mol), and the mixture was further stirred for 60 minutes. Thereto was added pentamethyldiethylenetriamine (2.00 mL, 9.58 mmol) to thereby initiate the polymerization. Then, 55 minutes later and thereon, butyl acrylate (3.76 L, 26.2 mol) was added over 260 minutes, during which, while the reaction was followed by sampling the reaction mixture, pentamethyldiethylenetriamine (5.00 mL, 24.0 mmol) was added portionwise. After completion of the addition of butyl acrylate, heating was further continued for 90 minutes. At this time, the consumption rate of butyl acrylate as determined by GC was 97.1%. The mixture was diluted with toluene and then treated with activated alumina, and the volatile matter was distilled off by heating under reduced pressure to give a colorless transparent polymer [I]. The polymer [1] obtained had a number average molecular weight of 10,800 with a molecular weight distribution of 1.15.

The above polymer [1] (2.0 kg), the above-mentioned potassium undecenoate (89 g) and dimethylacetamide (2 L) were placed in a glass vessel, and the mixture was heated at 70° C. with stirring in a nitrogen atmosphere for 3 hours.

The volatile matter was removed from the reaction mixture by heating under reduced pressure, the residue was diluted with toluene, and the dilution was filtered. The filtrate was concentrated by removing the volatile matter therefrom by heating under reduced pressure. To this was added aluminum silicate (Kyowaad 700PEL; product of Kyowa Chemical) in an amount of 20% by weight relative to the polymer, and the mixture was heated at 100° C. with stirring for 3 hours. The reaction mixture was diluted with toluene, the dilution was filtered, and the volatile matter was distilled off from the filtrate by heating under reduced pressure to give an alkenyl-terminated polymer (polymer [2]). $^1$H-NMR spectrometry revealed the introduction of 1.8 alkenyl groups per polymer molecule.

A one-liter pressure reaction vessel was charged with the polymer [2] (589 g), dimethoxymethylhydrosilane (24.3 mL, 0.20 mol), methyl orthoformate (10.8 mL, 0.098 mmol) and platinum(0)-1,1,3,3-tetramethyl-1,3-divinyldisiloxane complex. The amount of the platinum catalyst used was such that the mole ratio thereof to the alkenyl group in the polymer amounted to $5\times10^{-4}$ equivalents. The reaction mixture was heated at 100° C. for 1 hour. Then, 12.1 ml of dimethoxymethyl was added, and heating was further continued at 100° C. for 3 hours. The volatile matter was then distilled off from the mixture under reduced pressure, whereby a silyl group-terminated polymer (polymer [3]) was obtained. The polymer obtained had a number average molecular weight of 14,200 with a molecular weight distribution of 1.6. The average number of the silyl groups introduced per polymer molecule as determined by $^1$H-NMR spectrometry was 1.9.

Production Example 2

A 2-liter separable flask equipped with a reflux condenser and a stirrer was charged with CuBr (8.39 g, 0.0585 mol), and the reaction vessel inside was purged with nitrogen. Acetonitrile (112 mL) was added, and the contents were stirred on an oil bath at 70° C. for 30 minutes. Thereto were added butyl acrylate (224 mL), diethyl 2,5-dibromoadipate (23.4 g, 0.0650 mol) and pentamethyldiethylenetriamine (hereinafter referred to as "triamine" for short) (0.500 mL, 0.244 mmol), and the reaction was thereby started. While heating at 70° C. with stirring, butyl acrylate (895 mL) was added dropwise continuously over 150 minutes. During the adding of butyl acrylate, triamine (2.50 mL, 12.0 mmol) was added. After lapse of 310 minutes after start of the reaction, 1,7-octadiene (288 mL, 1.95 mol) and triamine (4.0 mL, 0.0195 mol) were added, and the heating at 70° C. with stirring was continued for 240 minutes.

The reaction mixture was diluted with hexane and passed through an activated alumina column, and the volatile matter was then distilled off under reduced pressure to give an alkenyl-terminated polymer (polymer [4]). The polymer [4] had a number average molecular weight of 20,000 with a molecular weight distribution of 1.3.

A 2-liter separable flask equipped with a reflux column was charged with the polymer [4] (1.0 kg), potassium benzoate (34.8 g) and N,N-dimethylacetamide (1 L), and the mixture was heated at 70° C. with stirring under a nitrogen stream for 15 hours. The N,N-dimethylacetamide was removed by heating under reduced pressure, and the residue was diluted with toluene. The toluene-insoluble matter (KBr and excess potassium benzoate) was filtered off using an activated alumina column. The volatile matter was distilled off from the filtrate by heating under reduced pressure to give a polymer (polymer [5]).

A 2-liter round-bottom flask equipped with a reflux column was charged with the polymer [5] (1 kg), aluminum silicate (200 g, Kyowaad 700PEL, product of Kyowa Chemical) and toluene (1 L), and the mixture was heated at 100° C. under a nitrogen stream for 5.5 hours. The aluminum silicate was filtered off, and the toluene was distilled off from the filtrate under reduced pressure to give a polymer (polymer [6]).

A one-liter pressure reaction vessel was charged with the polymer [6] (718.80 g), dimethoxymethylhydrosilane (27.55 mL, 0.223 mol), methyl orthoformate (8.14 mL, 0.074 mmol) and platinum(0)-1,1,3,3-tetramethyl-1,3-divinyldisiloxane complex. The amount of the platinum catalyst used was such that the mole ratio thereof to the alkenyl group in the polymer amounted to $5\times10^{-4}$ equivalents. The reaction mixture was heated at 100° C. for 5 hours. The volatile matter was then distilled off from the mixture under reduced pressure, whereby a silyl group-terminated vinyl polymer (polymer [7]) was obtained. The polymer obtained had a number average molecular weight of 23,000 as determined by GPC (on the polystyrene equivalent basis) with a molecular weight distribution of 1.4. The average number of the silyl groups introduced per polymer molecule as determined by H-NMR spectrometry was 1.7.

Production Example 3

Synthesis of an Alkenyl Group-containing Carboxylic Acid Salt

10-Undecenic acid (150 g, 0.814 mol) and potassium tert-butoxide (91.3 g, 0.814 mol) were added to methanol (250 mL), and the mixture was stirred at 0° C. The volatile matter was distilled off by heating under reduced pressure to give potassium undecenoate represented by the following formula:

$$CH_2=CH-(CH_2)_8-CO_2^-{}^+K$$

Semi-batchwise Polymerization of BA-1 kg

A 2-liter glass reaction vessel was charged with cuprous bromide (8.39 g, 0.0585 mol) and acetonitrile (112 mL), and the contents were heated at 70° C. for 60 minutes. Thereto was added butyl acrylate (224 mL, 1.56 mol), and the mixture was further stirred for 30 minutes. Thereto was added pentamethyldiethylenetriamine (0.41 mL, 1.95 mmol) to thereby initiate the polymerization. Thereafter, while the reaction was followed by sampling the reaction mixture, pentamethyldiethylenetriamine (5.66 mL, 27.1 mmol) was added and, 55 minutes after start of the reaction and thereon, butyl acrylate (895 mL, 6.24 mol) was added over 140 minutes. After completion of the addition of butyl acrylate, heating was further continued for 170 minutes. At this time, the consumption rate of butyl acrylate as determined by GC measurement was 92.9%. The mixture was diluted with toluene and then treated with activated alumina, and the volatile matter was distilled off by heating under reduced pressure to give a colorless transparent polymer [8]. The polymer [8] obtained had a number average molecular weight of 21,000 with a molecular weight distribution of 1.1.

The above polymer [8] (0.35 kg), the above-mentioned potassium undecenoate (8.85 g) and dimethylacetamide (350 mL) were placed in a glass vessel, and the mixture was heated at 70° C. with stirring in a nitrogen atmosphere for 3 hours. The volatile matter was removed from the reaction mixture by heating under reduced pressure, the residue was diluted with toluene and the dilution was filtered. The filtrate was concentrated by removing the volatile matter therefrom by heating under reduced pressure. To this was added aluminum silicate (Kyowaad 700PEL; product of Kyowa Chemical) in an amount of 20% by weight relative to the polymer, and the mixture was heated at 100° C. with stirring for 3 hours. The reaction mixture was diluted with toluene, the dilution was filtered, and the volatile matter was distilled off from the filtrate by heating under reduced pressure to give an alkenyl-terminated polymer (polymer [9]).

$^1$H-NMR spectrometry revealed the introduction of 1.9 alkenyl groups per polymer molecule.

A one-liter pressure reaction vessel was charged with the polymer [9] (350 g), dimethoxymethylhydrosilane (12.3 mL, 0.20 mol), methyl orthoformate (3.65 mL, 0.033 mmol) and platinum(0)-1,1,3,3-tetramethyl-1,3-divinyldisiloxane complex. The amount of the platinum catalyst used was such that the mole ratio thereof to the alkenyl group in the polymer amounted to $5 \times 10^{-9}$ equivalents. The reaction mixture was heated at 100° C. for 90 minutes. The volatile matter was then distilled off from the mixture under reduced pressure, whereby a silyl group-terminated polymer (polymer [10]) was obtained. The polymer obtained had a number average molecular weight of 26,000 with a molecular weight distribution of 1.2. The average number of the silyl groups introduced per polymer molecule as determined by $^1$H-NMR spectrometry was 1.4.

Production Example 4

A 50-liter polymerizer equipped with a reflux condenser and a stirrer was charged with CuBr (251.82 g, 1.76 mol), and the reaction vessel inside was purged with nitrogen. Acetonitrile (3, 360 mL) was added, and the contents were stirred at 68° C. for 20 minutes. Thereto were added butyl acrylate (6.80 L), diethyl 2,5-dibromoadipate (526.70 g, 1.46 mol) and pentamethyldiethylenetriamine (hereinafter referred to as "triamine" for short) (12.0 mL, 0.0585 mmol), and the reaction was thereby started. While heating at 70° C. with stirring, butyl acrylate (26.80 L) was added dropwise continuously over 204 minutes. During the adding of butyl acrylate, triamine (36.0 mL, 0.176 mol) was added. After lapse of 397 minutes after start of the reaction, 1,7-octadiene (8,640 mL, 58.5 mol) and triamine (120 mL, 0.585 mol) were added, and the mixture was heated at 80° C. with stirring for 240 minutes. Thereafter, triamine (80 mL, 0.390 mol) was added, and the mixture was heated at 90° C. for 240 minutes.

The reaction mixture was diluted with toluene, the insoluble copper complex was removed using a separating plate type centrifugal settler, the supernatant was passed through an activated alumina column, and the volatile matter was then distilled off under reduced pressure to give an alkenyl-terminated polymer (polymer [11]). The polymer [11] had a number average molecular weight of 24,000 with a molecular weight distribution of 1.21.

A 10-liter separable flask equipped with a reflux condenser was charged with the polymer [11] (3.0 kg), potassium benzoate (69.9 g) and N,N-dimethylacetamide (3 L), and the mixture was heated at 100° C. with stirring under a nitrogen stream for 10 hours. The N,N-dimethylacetamide was removed by heating under reduced pressure, and the residue was diluted with toluene. The toluene-insoluble matter (KBr and excess potassium benzoate) was filtered off using an activated alumina column. The volatile matter was distilled off from the filtrate under reduced pressure to give a polymer (polymer [12]).

A 10-liter round-bottom flask equipped with a reflux condenser was charged with the polymer [12] (3 kg), hydrotalcite (450 g, Kyowaad 500SH, Kyowaad700SL, product of Kyowa Chemical) and xylene (0.6 L), and the mixture was heated at 130° C. with stirring under a nitrogen stream for 5.0 hours. The aluminum silicate was filtered off, and the solvent was distilled off from the filtrate under reduced pressure to give a polymer (polymer [13]).

A 2-liter reaction vessel was charged with the polymer [13] (1,000 g), dimethoxymethylhydrosilane (45 mL, 0.365 mol), methyl orthoformate (13.3 mL, 0.122 mmol) and platinum(0)-1,1,3,3-tetramethyl-1,3-divinyldisiloxane complex (30 ppm as platinum). The reaction mixture was heated at 100° C. with stirring for 10 hours. In the course of the reaction, the platinum catalyst and dimethoxymethylsilane were added. The additional amount of the platinum catalyst was 120 ppm as platinum, and the additional amount of dimethoxymethylsilane was 15 mL. The volatile matter was then distilled off from the mixture under reduced pressure, whereby a silyl group-terminated polymer (polymer [14]) was obtained. The polymer obtained had a number average molecular weight of 28,500 as determined by GPC (polystyrene equivalent basis) with a molecular weight distribution of 1.4. The average number of the silyl groups introduced per polymer molecule as determined by $^1$H-NMR spectrometry was 2.5.

Example 1

Heavy or ground calcium carbonate (100 parts; Softon 3200; product of Bihoku Funka Kogyo) having a specific surface area of 3.2 m$^2$/g (particle size 0.7 µm) was admixed with 100 parts of the polymer [3] obtained in Production Example 1, and the mixture was cured indoors at 50° C. for 2 days using a tetravalent tin catalyst (dibutyltin diacetylacetonate), whereby a cured product was obtained. No. 2 (⅓) dumbbell test specimens were punched out from the sheet-like cured product and the tensile test was carried out using a Shimadzu autograph (measurement conditions: 23° C., 200 mm/min).

Example 2

A cured product was produced in the same manner as in Example 1 except that 100 parts of another grade of heavy or ground calcium carbonate (PO 320B; product of Shiraishi Calcium) treated with a fatty acid-based surface treatment agent but comparable in specific surface area was used in lieu of the heavy or ground calcium carbonate used in Example 1. The product was subjected to tensile testing in the same manner.

Comparative Example 1

A cured product was produced in the same manner as in Example 1 except that 100 parts of a grade of heavy or ground calcium carbonate (Whiton S B; product of Shiraishi Calcium) having a specific surface area of 1.2 m$^2$/g (particle size 1.8 µm) was used in lieu of the heavy or ground calcium carbonate used in Example 1. The product was subjected to tensile testing in the same manner.

Comparative Example 2

A cured product was produced in the same manner as in Example 1 except that 100 parts of a grade of heavy or ground calcium carbonate (Lighton A; product of Bihoku Funka Kogyo) treated with a fatty acid-based surface treatment agent but comparable in specific surface area was used in lieu of the heavy or ground calcium carbonate used in Comparative Example 1. The product was subjected to tensile testing in the same manner. The results of tensile testing of the respective cured products are shown in Table 1.

TABLE 1

| | Specific surface area (m²/g) | Particle size (μm) | M50 (MPa) | Tmax (MPa) | Eb (%) |
|---|---|---|---|---|---|
| Example 1 | 3.2 | 0.7 | 0.60 | 1.75 | 180 |
| Example 2 | 3.2 | 0.7 | 0.57 | 1.21 | 160 |
| Comparative Example 1 | 1.2 | 1.8 | 0.59 | 1.06 | 100 |
| Comparative Example 2 | 1.2 | 1.8 | 0.58 | 0.90 | 110 |

Example 3

Heavy or ground calcium carbonate (100 parts; Softon 3200; product of Bihoku Funka Kogyo) having a specific surface area of 3.2 m²/g (particle size 0.7 μm) was admixed with 100 parts of the polymer [7] obtained in Production Example 2, and the mixture was cured indoors at 50° C. for 2 days using a tetravalent tin catalyst (dibutyltin diacetylacetonate), whereby a cured product was obtained.

Example 4

A cured product was produced in the same manner as in Example 3 except that 100 parts of another grade of heavy or ground calcium carbonate (Nanox #25; product of Maruo Calcium) having a specific surface area of 2.5 m²/g (particle size 0.9 μm) was used in lieu of the heavy or ground calcium carbonate used in Example 3.

Comparative Example 3

A cured product was produced in the same manner as in Example 3 except that 100 parts of a grade of heavy or ground calcium carbonate (Whiton S B; product of Shiraishi Calcium) having a specific surface area of 1.2 m²/g (particle size 1.8 μm) was used in lieu of the heavy or ground calcium carbonate used in Example 3.

The respective cured products after curing were subjected to tensile testing. No. 2 (⅓) dumbbell test specimens were punched out from each sheet-like cured product and the tensile test was carried out using a Shimadzu autograph (measurement conditions: 23° C., 200 mm/min). The results are shown in Table 2.

TABLE 2

| | Specific surface area (m²/g) | Particle size (μm) | M50 (MPa) | Tmax (MPa) | Eb (%) |
|---|---|---|---|---|---|
| Example 3 | 3.2 | 0.7 | 0.23 | 1.53 | 320 |
| Example 4 | 2.5 | 0.9 | 0.28 | 1.46 | 330 |
| Comparative Example 3 | 1.2 | 1.8 | 0.28 | 0.95 | 240 |

Example 5

Heavy or ground calcium carbonate (100 parts; Softon 3200; product of Bihoku Funka Kogyo) having a specific surface area of 3.2 m²/g (particle size 0.7 μm) was admixed with 100 parts of the polymer [10] obtained in Production Example 3, and the mixture was cured indoors at 50° C. for 2 days using a tetravalent tin catalyst (dibutyltin diacetylacetonate), whereby a cured product was obtained.

Example 6

A cured product was produced in the same manner as in Example 5 except that 100 parts of another grade of heavy or ground calcium carbonate (PO 320B; product of Shiraishi Calcium) treated with a fatty acid-based surface treatment agent and comparable in specific surface area was used in lieu of the heavy or ground calcium carbonate used in Example 5.

Comparative Example 4

A cured product was produced in the same manner as in Example 5 except that 100 parts of a grade of heavy or ground calcium carbonate (Whiton SB; product of Shiraishi Calcium) having a specific surface area of 1.2 m²/g (particle size 1.8 μm) was used in lieu of the heavy or ground calcium carbonate used in Example 5.

The respective cured products after curing were subjected to tensile testing. No. 2 (⅓) dumbbell test specimens were punched out from each sheet-like cured product and the tensile test was carried out using a Shimadzu autograph (measurement conditions: 23° C., 200 mm/min). The results are shown in Table 3.

TABLE 3

| | Specific surface area (m²/g) | Particle size (μm) | M50 (MPa) | Tmax (MPa) | Eb (%) |
|---|---|---|---|---|---|
| Example 5 | 3.2 | 0.7 | 0.38 | 1.43 | 210 |
| Example 6 | 3.2 | 0.7 | 0.37 | 1.35 | 270 |
| Comparative Example 4 | 1.2 | 1.8 | 0.40 | 0.95 | 140 |

Further, the cured products of Examples 1 and 2 and Comparative Examples 1 and 2 as each produced on a glass sheet (for use according to JIS A 5758; 50×50×5 mm) were irradiated with ray, among others, from the glass surface side for 500 hours using a xenon weather meter (Suga Shikenki model SX 120, radiant intensity 180 W, black panel temperature 63° C., 18 minutes of raining during 2 hours of irradiation). After irradiation, each specimen was subjected to manual peel testing for observing the condition of failure. The results are shown in Table 4.

TABLE 4

| | Example 1 | Example 2 | Comparative Example 1 | Comparative Example 2 |
|---|---|---|---|---|
| Manual peel test (initial) | ○ | ○ | ○ | ○ |
| (After 500 hrs in SWM) | ○ | ○ | Δ | Δ |

Manual Peel Test cohesive failure (CF) ←○>Δ>X→ interfacial failure

In the table, ○ denotes cohesive failure, X denotes interfacial failure, and Δ denotes mixed occurrence of cohesive failure and interfacial failure.

Example 7

Heavy or ground calcium carbonate (200 parts; Softon 3200; product of Bihoku Funka Kogyo) having a specific surface area of 3.2 m²/g (particle size 0.7 μm) was manually admixed with 50 parts of DIDP (product of Kyowa Hakko) and 100 parts of the polymer [14] obtained in Production Example 4, and the mixture was thoroughly kneaded up using a three-roll paint mill to give a curable composition. The viscosity of the compound was measured using a BS type viscometer (rotor No. 7, measurement environment 23° C.). The results are shown in Table 5.

Example 8

A curable composition was prepared in the same manner as in Example 7 except that 200 parts of another grade of heavy or ground calcium carbonate (Nanox #25; product of Maruo Calcium) having a specific surface area of 2.3 m²/g (particle size 1.2 μm) was used in lieu of the heavy or ground calcium carbonate used in Example 1. The viscosity of the compound was measured using a BS type viscometer (rotor No. 7, measurement environment 23° C.). The results are shown in Table 5.

Comparative Example 5

A curable composition was prepared in the same manner as in Example 7 except that 200 parts of a grade of heavy or ground calcium carbonate (Whiton S B; product of Shiraishi Calcium) having a specific surface area of 1.2 m²/g (particle size 1.8 μm) was used in lieu of the heavy or ground calcium carbonate used in Example 1. The viscosity of the compound was measured using a BS type viscometer (rotor No. 7, measurement environment 23° C.). The results are shown in Table 5.

TABLE 5

|  | Example 7 | Example 8 | Comparative Example 5 |
|---|---|---|---|
| Specific surface area (m²/g) | 3.2 | 2.3 | 1.2 |
| Particle size (μm) | 0.7 | 1.2 | 1.8 |
| Viscosity Pa · s |  |  |  |
| 1 rpm | 219 | 213 | 120 |
| 2 rpm | 216 | 207 | 123 |
| 5 rpm | 206 | 190 | 124 |
| 10 rpm | 198 | 175 | 122 |
| Viscosity ratio |  |  |  |
| 1 rpm/10 rpm | 1.1 | 1.2 | 1.0 |
| 2 rpm/10 rpm | 1.1 | 1.2 | 1.0 |

The results shown in Table 5 indicate that the viscosity ratios of the compounds of Examples 7 and 8 are higher than those of the compound of Comparative Example 5. The viscosity ratio is the value resulting from comparison of the viscosity at a lower shear rate (1 or 2 rpm) with that at a higher shear rate (10 rpm). The viscosity at a low shear rate is close to the viscosity in a stationary state, while the viscosity at a high shear rate is close to the viscosity during working and application. Therefore, a high viscosity ratio means that the viscosity at rest is relatively high and the viscosity during application is low. When the viscosity ratio is high, the viscosity in the step of working is low and the knife releasability is good, so that operations can be conducted with ease and, after application, sagging will hardly occur.

INDUSTRIAL APPLICABILITY

The invention relates to a curable composition comprising a crosslinking silyl-containing vinyl polymer.

The curable composition of the invention can be utilized, for example, as sealants such as elastic sealants for building and construction, electric or electronic part materials such as solar battery backside sealants, electric insulating materials such as insulating sheath of wire or cable, pressure sensitive adhesives, adhesives, and paints.

What is claimed is:

1. A curable composition which comprises the following two components:
   (A) a vinyl polymer (I) having at least one crosslinking functional group and
   (B) heavy or ground calcium carbonate (II) having a specific surface area of not smaller than 1.5 m²/g but not larger than 50 m²/g, said specific surface area being measured using the air permeation method.

2. The curable composition according to claim 1, wherein the vinyl polymer (I) has a molecular weight distribution value of less than 1.8.

3. The curable composition according to claim 1, wherein the main chain of the vinyl polymer (I) is one produced by polymerizing a monomer selected from the group consisting of (meth)acrylic monomers, acrylonitrile monomers, aromatic vinyl monomers, fluorine-containing vinyl monomers and silicon-containing vinyl monomers as a main monomer.

4. The curable composition according to claim 1, wherein the vinyl polymer (I) is a (meth)acrylic polymer.

5. The curable composition according to claim 1, wherein the vinyl polymer (I) is an acrylic polymer.

6. The curable composition according to claim 5, wherein the vinyl polymer (I) is an acrylic ester-based polymer.

7. The curable composition according to claim 6, wherein the vinyl polymer (T) is a butyl acrylate-based polymer.

8. The curable composition according to claim 1, wherein the crosslinking functional group of the vinyl polymer (I) is a crosslinking silyl group.

9. The curable composition according to claim 1, wherein the crosslinking functional group of the vinyl polymer (I) is an alkenyl group.

10. The curable composition according to claim 1, wherein the crosslinking functional group of the vinyl polymer (I) is a hydroxyl group.

11. The curable composition according to claim 1, wherein the crosslinking functional group of the vinyl polymer (I) is an amino group.

12. The curable composition according to claim 1, wherein the crosslinking functional group of the vinyl polymer (I) is a group having a polymerizable carbon-carbon double bond.

13. The curable composition according to claim 1, wherein the crosslinking functional group of the vinyl polymer (I) is an epoxy group.

14. The curable composition according to claim 1, wherein the main chain of the vinyl polymer (I) is one produced by living radical polymerization.

15. The curable composition according to claim 14, wherein the living radical polymerization consists in atom transfer radical polymerization.

16. The curable composition according to claim 15, wherein the atom transfer radical polymerization uses, as a catalyst, a complex selected from transition metal complexes having, as the main metal, an element of the group 7, 8, 9, 10 or 11 of the periodic table of the elements.

17. The curable composition according to claim 16, wherein the metal complex used as the catalyst is a complex selected from the group consisting of complexes of copper, nickel, ruthenium or iron.

18. The curable composition according to claim 17, wherein the metal complex used as the catalyst is a copper complex.

19. The curable composition according to claim 1, wherein the heavy or ground calcium carbonate (II) is a surface-treated grade of heavy or ground calcium carbonate.

20. The curable composition according to claim 1, which contains 5 to 500 parts by weight of heavy or ground calcium carbonate (II) per 100 parts by weight of the vinyl polymer (I).

21. The curable composition according to claim 1, which comprises 0.1 to 20 parts by weight of a silane coupling agent as a (C) component.

* * * * *